US005842193A

United States Patent [19]
Reilly

[11] Patent Number: 5,842,193
[45] Date of Patent: Nov. 24, 1998

[54] KNOWLEDGE BASED PLANNING AND ANALYSIS (KBPA)™

[75] Inventor: John P. Reilly, Dallas, Tex.

[73] Assignee: Sterling Software, Inc., Dallas, Tex.

[21] Appl. No.: 595,888

[22] Filed: Feb. 6, 1996

Related U.S. Application Data

[60] Provisional application No. 60/003,332 Jul. 28, 1995.

[51] Int. Cl.[6] .......... G06F 17/00

[52] U.S. Cl. .......... 706/45; 706/46; 706/59; 706/60; 364/274.4; 364/274.8

[58] Field of Search .......... 395/50, 62, 75, 395/76; 364/274.4, 274.8; 706/45, 46, 59, 60, 53

[56] References Cited

U.S. PATENT DOCUMENTS

| | | | |
|---|---|---|---|
| 4,841,411 | 6/1989 | Nixon et al. | 361/323 |
| 5,233,513 | 8/1993 | Doyle | 705/7 |
| 5,249,300 | 9/1993 | Bachman et al. | 707/104 |
| 5,696,962 | 12/1997 | Kupiec | 707/4 |

*Primary Examiner*—Tariq R. Hafiz
*Assistant Examiner*—Jason W. Rhodes
*Attorney, Agent, or Firm*—Baker & Botts, L.L.P.

[57] ABSTRACT

A knowledge based planning and analysis system (30) is provided which includes a toolset (32) of expert systems and a knowledge base, or object repository (40). The system (30) assists a user in developing, customizing and analyzing reusable objects which are used to build model businesses. The models include data objects and activity objects which are decomposed in parallel until they can no longer be decomposed or until the process is terminated by the user.

2 Claims, 10 Drawing Sheets

KNOWLEDGE BASED PLANNING AND ANALYSIS (KBPA)™

RELATED APPLICATIONS

This application claims the benefit of U.S. Provisional Patent Application No. 60/003,332, "Knowledge Based Planning and Analysis (KbPA)," filed Jul. 28, 1995.

The present invention is related to patent application Ser. No. 07/986,657, attorney docket number TI-16492, filed Dec. 8, 1992, entitled "System and Method for the Design of Software System Using a Knowledge Base" and patent application Ser. No. 08/561,901, attorney docket number TI-16492A, filed Nov. 22, 1995, entitled "System and Method for the Design of Software Systems Using a Knowledge Base".

TECHNICAL FIELD OF THE INVENTION

This invention relates in general to expert systems and knowledge bases and more particular to a method and system for creating business models using expert systems and knowledge bases.

BACKGROUND OF THE INVENTION

Recurring periods of expanding and contracting economic conditions make up the business cycle. Nationally, these cycles affect growth, employment, and inflation and have considerable impact on corporate expansion, earnings, and cash flow. Thus, it is crucial that the product development cycle be in tune with the business cycle.

During the last few decades, however the length of the business cycle has gotten shorter. During the 1980's, a business cycle of five years was typical. Now a cycle of 18 to 24 months, or even less, is more typical.

Developing a viable strategy for coping with this accelerated business cycle requires attention to the forces for change that shape today's business conditions. Theses forces include:

Tougher Competition—No longer is product price the primary determinant for market success. Competitiveness now centers on the ability to meet customer's needs. Customers want products that meet their expectations and they want them now. Unlike price, which is specific, customer needs come in many forms. An often used market tactic is identifying a niche in the market and developing products to meet the needs of that segment. There are growing numbers of vendors that understand this strategy and implement it successfully.

Global Markets—Competition has intensified not only in domestic markets, but also in global markets because of the growth of multinational corporations. The world is now the marketplace and competition comes from all corners. There are few protected markets anymore and even fewer protected industries. No longer is Made in the USA the label for the country of origin for many of the products we consume or the systems we use.

Changing Patterns of Demand—Traditionally, manufacturers offered mass produced products and consumers selected items closest to their needs from whatever was available. Now customers readily find exactly what they want within the growing number and increasing availability of customized products. In product after product, customers are asking for and getting more choice, better safety, lower cost, and higher quality in shorter time.

New technology—Constant innovation, particularly in information technology, speeds the awareness, demand, and delivery of products to meet customer needs. Indeed, information technology often creates wants where none existed before. New technology has spawned countless new products and accelerated their development and market introduction.

Changing Relationships—Long term customer/supplier relationships frequently break down in the face of today's radically changed market structures and customer preferences. Simply being long established or large in size no longer carries much weight with potential customers who look closely at product benefits, quality, safety, cost and availability.

Economic Instability—Compression of the business cycle coupled with unevenness between economic sectors inflates the lure of success and the risk of failure. In either case, one must act quickly to gain benefits and avoid losses. Opportunities come and go quickly and the only sure way to realize them is through knowledge, planning, and preparation.

Meeting customer needs, even in today's rapidly changing business environment, by providing what they want as quickly as possible returns several benefits to the provider. These benefits include customer loyalty, reduced costs for both the customer and the provider, and customers willing to pay premium prices for products and services that the customer hasn't found elsewhere.

Gaining understanding of the customer's needs as quickly and as accurately as possible requires close and continuous contact between the customer and the provider. Even in highly technical areas such as application software development or Information Engineering (IE), involving customers as part of the project team generates valuable input not obtainable elsewhere, even at considerable cost.

The highly technical nature of software development, however presents a barrier to effective, rapid translation of customer need/preferences to a usable product. Furthermore, the customer should not be required to understand the technical aspects of software development in order to present those needs/preferences to the provider.

Thus, what is needed is a method and system for improving the software development life cycle and in particular for shortening and for providing for customer interaction during the planning and analysis phases of the software development life cycle.

SUMMARY OF THE INVENTION

During planning and analysis, IE concepts facilitate both data modeling and activity modeling at the conceptual level. Grasping these concepts, however, just after being introduced to IE is particularly difficult. The present invention, on the other hand, uses terms familiar to the business and does not use IE-specific terms in an interactive dialog thereby facilitating participation of less technically oriented users in data and activity modeling during the planning and analysis stages of the software development life cycle.

In prior art systems, planning and analysis techniques are technology-independent. Therefore, in prior art systems, the user can usually disregard technology-dependent implementation considerations which must instead be addressed during the design phase. The present invention, on the other hand, treats both data analysis and activity analysis in terms of the business's characteristics and allows decomposition of data and activity in parallel. The user thus begins from a base that is familiar, his own business situation.

Using terms familiar to the user's business environment in an interactive dialog, the present invention effectively insulates the user from having to know IE concepts and techniques. All the user need understand is that they are building a business model to use in designing a system. The reason this approach succeeds is that certain inferences can be drawn about the relationship between data and activity and their properties. These inferences have been proven by the many models built using IE and have been transformed into a knowledge base used in the present invention.

Using the knowledge base, the present invention poses questions to the user using a top-down approach seeking to determine the who, what, when, where, and why aspects of the application being developed. In using the top-down approach, the initial objective is to establish a high level scope of the analysis. This enables identification of the root function or subject area that is the scope of the planning or analysis.

Objects representing the identified root function or subject area are then decomposed into other objects, that is, data and/or activity objects, by describing the object, defining its properties, and defining its relationship with other objects.

Decomposition of the data and activity objects is done in parallel level-by-level down to the level desired. Parallel decomposition eases the modeling task and ensures that consistency and cohesion between objects is retained throughout the decomposition process.

BRIEF DESCRIPTION OF THE DRAWINGS

These and other features of the invention will be apparent to those skilled in the art from the following detailed description of the invention, taken together with the accompanying drawings in which.

DETAILED DESCRIPTION OF THE INVENTION

The present invention, Knowledge Based Planning and Analysis (KbPA)™, is a software application system and method generated using Composer by IEF™, a product of the assignee, Texas Instruments. The present invention is comprised of expert systems and a knowledge base which allow a user to interactively create, customize and analyze models of business data, business activities and interactions between the business data and business activities. The models constructed using the present invention are then customized to any level of detail in accordance with user instructions. Various ones of the constructed models are stored and later reused to assist in building other business systems to user specifications.

Figure 1:
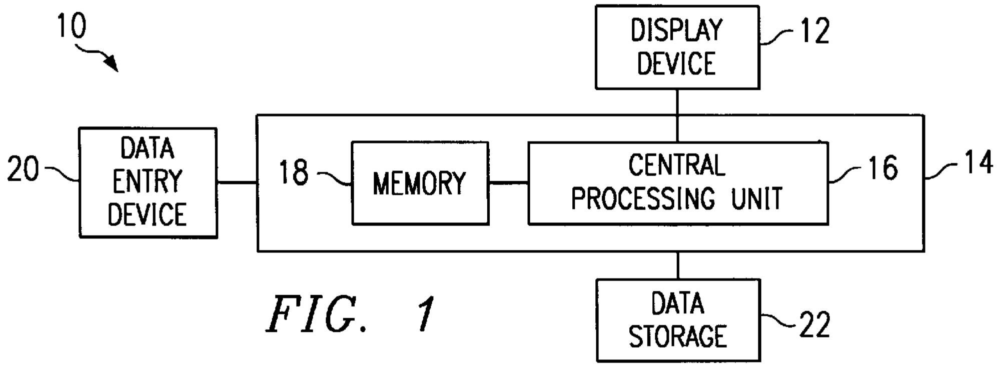
FIG. 1 is an exemplary computer system used in the present invention.

The present invention is implemented on a computer system 10, such as that shown in FIG. 1, which includes a computer 14 comprising a memory 18 and a central processing unit 16. The computer 14 is connected to a data entry device 20 (such as a keyboard and/or a mouse), a data storage device 22 and a display device 12. The computer system 10 on which the system 30 is programmed executes Composer by IEF™ in a distributed, networked environment. It is contemplated, however, that various other embodiments will be readily apparent to those of ordinary skill in the art.

Figure 2:
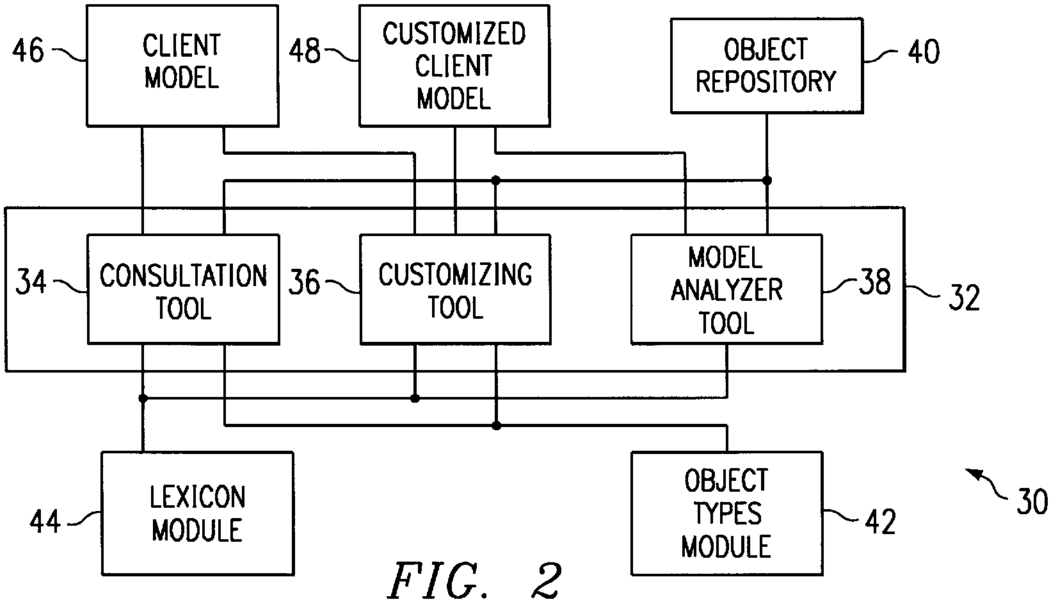
FIG. 2 is a block diagram illustrating the present invention.

As shown in the block diagram in FIG. 2, the system 30 of the present invention uses expert systems (a Consultation Tool 34, a Customization Tool 36, and a Model Analyzer Tool 38), and a knowledge base (Object Repository 40) to create a Client Model 46 and then to customize the Client Model 46 to a particular level of detail, as determined by the user, to generate a Customized Client Model 48. The Customized Client Model 48 may then be stored to the Object Repository 40 for use as a component in other business systems.

The Object Repository 40 includes industry specific encyclopedia objects such as occurrences of subject areas, functions, entity types, processes, attributes, etc. that are used to create the Customized Client Model 48 which defines a particular business, business area, or application. The Object Repository 40 includes, for example, objects representing all of the functions that make up a financial institution or a manufacturing company or a cleaning service.

The method of the present invention builds on the interaction with the user to interactively define user needs using self-generating, self-learning questionnaires driven by one of the expert systems.

From these defined user needs, the system 30 assists the user in building a Client Model 46 which can be customized to any degree desired.

The system 30 includes a toolset 32 which includes three expert systems that perform the functions of consultation, customizing, and model analysis to generate business models comprised of one or more reusable objects.

In contrast to most expert systems that contain rules written out explicitly by knowledge engineers, the system 30 uses a knowledge base, Object Repository 40, to become an expert in the area. As modeling progresses, the system 30 learns and updates its knowledge base, the Object Repository 40, accordingly.

Thus, the system 30 uses a top-down approach that combines the use of divide-and-conquer techniques with one of adding increasing detail as the modeling progresses.

The initial Client Model 46 is constructed by interacting with the user. This interaction is facilitated by the Consultation Tool 32 which presents questions to the user in an interactive dialog and then uses the responses to those questions to initialize the process, to determine how far to carry the decomposition of objects, and to determine how and when to interact with the other components of the system 30. The interactive dialog between the user and the Consultation Tool 32 also facilitates the identification of objects and of aliases and synonyms of the identified objects.

Initialization questions assist the Consultation Tool 32 in determining the scope of the analysis. For example, the user is asked whether part or all of a business is to be analyzed, the name of the part or the whole, etc.

Responses to interaction questions are used by the Consultation Tool 32 to define the interaction between the Consultation Tool 32 and the Customizing Tool 36 and to determine how and when objects are extracted from the Object Repository 40.

As an example, the Consultation Tool 32 queries the user using the following sequence of questions:

"Do you want to pick an object?"

"Or have the Customizing Tool 36 search and retrieve objects from the Object Repository 40 as you go along?"

"Or wait until you are finished?"

"Or do you want to tell when you want to pick an object from the Object Repository 40 at one point or another?"

Once control is transferred to the Customizing Tool 36, the Customizing Tool 36 retrieves similar objects from the Object Repository 40 in accordance with the user's responses to alias and synonym questions posed by the Consultation Tool 34. These retrieved objects are returned to the Consultation Tool 34 and presented for review by the user. This moving back and forth between consulting and customizing is an interactive process that shapes the Client Model 46 into the Customized Client Model 48 which may be used as input to the next level in the software application development life cycle.

After the Client Model 46 has been customized to the user's needs, the resulting Customized Client Model 48 may also be added to the Object Repository 40 to enlarge the stored base of objects. The customizing step using the Customizing Tool 36 is discussed in more detail hereinbelow.

The next step, model analysis, performed using the Model Analyzer Tool 38, is an optional function that enables the user to determine the degree of fit between the Customized Client Model 48 generated using the Customizing Tool 36 and existing models in the Object Repository 40 that are more complete. The analysis and comparison steps using the Model Analyzer Tool 38 are discussed in more detail hereinbelow.

Both the model customizing step, performed using the Customizing Tool 36, and the model analysis and comparison steps, performed using the Model Analyzer Tool 38, are optional. After customizing the Client Model 46 using the Customizing Tool 36 and/or analyzing and comparing the Customized Client Model 48 using the Model Analyzer Tool 38, the user can return to the Consultation Tool 34, replacing the Client Model 46 with the generated Customized Client Model 48, to continue defining the Client Model 46 or terminate the process and store the resulting Customized Client Model 48 to the Object Repository 40.

One component of the system 30, the Lexicon Module 44, supports all three of the expert systems in the Toolset 32. The Lexicon Module 44 is a collection of databases used to tailor the model defining, customizing, analysis and comparison steps to the particular business enterprise being analyzed. The Lexicon Module 44 includes: a Dictionary which is a database of words, phrases, and names used to validate words entered by the user in response to questions posed; a Thesaurus for determining synonyms and aliases; and a Parts-of-Speech Module for identifying and removing words from user responses which are not essential to the meaning, such as articles and prepositions. Another function of the Parts-of-Speech Module is to select nouns for use in identifying and defining data objects and verbs for use in identifying and defining activity objects.

The Object Types Module 42 supports the Consultation Tool 34 and the Customizing Tool 36. An object type is a component of a deliverable that is produced by expending effort in performing one or more project tasks to develop it. For example, the components of an Entity Relationship Diagram (ERD) include the object types entity types and relationships. The Object Types Module 42 facilitates extracting applicable objects from the Object Repository 40 based on the associated object type.

The Object Repository 40, a collection of reusable objects, like the Lexicon Module 44, supports all three of the expert systems. The reusable objects stored in the Object Repository 40 cover a wide variety of businesses and services and represent the collective experience of hundreds of person years of industry specific experience in Composer by IEF™ projects.

Storing and reusing the objects in the Object Repository 40 provides advantages in that (1) significant time is eliminated in planning and analysis by starting from a model at some state of completion rather than starting from scratch; (2) effort can be directed to the business data and business activities that make the model unique, not to what the model has in common with other models; and(3) the Client Model 46 can be initially constructed, using the stored objects, to any level of detail during planning or analysis making it more than just a template.

Figure 3:
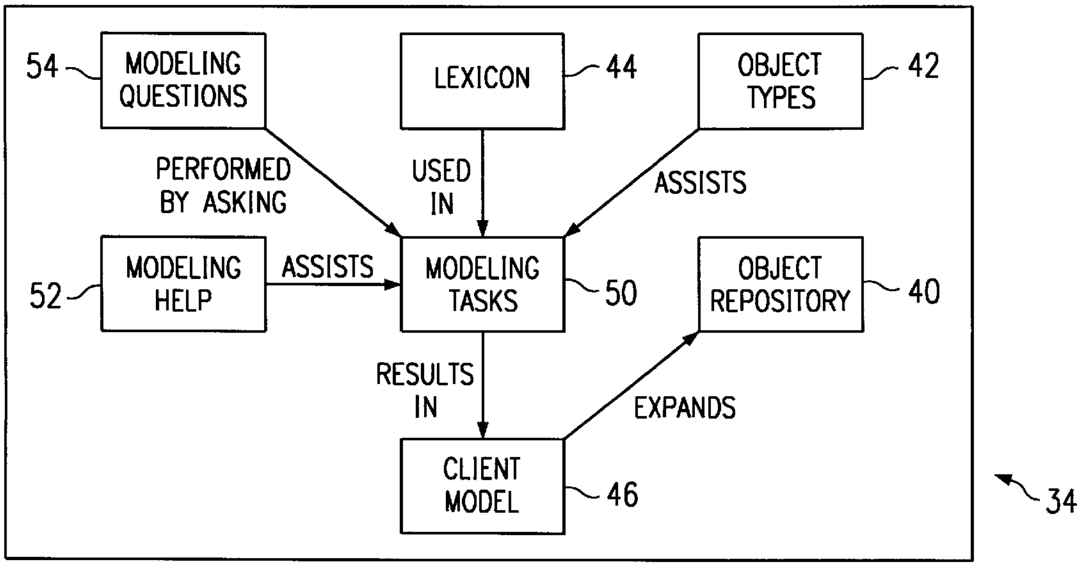
FIG. 3 shows a block diagram illustrating the Consultation Tool of the present invention.

Returning to the Consultation Tool 34, as shown in more detail in FIG. 3, various tasks are performed by a Modeling Tasks Module 50 which uses questions stored in the Modeling Questions Module 54 to assist the user in building a model.

A Modeling Help Module 52 provides helps to the user enabling the user to respond to the questions asked by the Modeling Tasks Module 50. For example, the user may ask for a description of what is meant by a particular term in a question or for an example of what is wanted. The Modeling Help Module 52 keeps the help dialog moving forward and serves to focus the interaction between the user and the system 30.

To identify objects to decompose, the Consultation Tool 34 asks questions such as:

What type of business are you in? (to determine what objects to extract)

Who are your Customers?

What is your Product?

Who do you get your Product Components from?

What do you call the Product Components obtained?

How is the Product put together?

How do Customers get (obtain) Product?

How do Customers get Product delivered?

How do Customers pay for Product?

Are units of Payment maintained by you?

How are the Product Components obtained?

How do you get units of Payment?

Note that these generally address the what, where, who, when, and how of the enterprise. The who and what questions focus on data whereas the how questions relate to activity.

The Modeling Tasks Module 50 also receive assistance from the Lexicon Module 44 to convert user responses to the modeling questions into terminology to construct objects which make up the Client Model 46. The Lexicon Module 44 resolves sentences into component parts of speech and strips out words not essential to the meaning. Thus, the Lexicon Module 44 assists in the identification of objects included in the Client Model 44.

The Modeling Tasks Module 50 also performs parallel decomposition, as discussed in detail in Appendix A, herein incorporated by reference in it's entirety, of the objects in the Client Model 44. Parallel decomposition is a step-by-step breakdown of functions into subfunctions or processes, as used in Composer by IEF™ data and activity analysis. Using the questions defined in the Modeling Questions Module 54, the Modeling Tasks Module 50 asks questions of the user and uses the responses to determine the types of objects to identify, the type of objects the objects will decompose into, and which of the objects to decompose.

The Consultation Tool 34 iterates between decomposing data objects and decomposing activity objects until the objects can no longer be decomposed or until the process is terminated by the user. During the decomposition step, the Consultation Tool 34 decomposes all of the objects at one level before decomposing any of the objects at another level unless the user terminates the process before the current level processing is complete.

Once the objects have been identified and decomposed, the Consultation Tool 34 classifies each of the decomposed objects as either a data object or as an activity object. The consultation step further classifies the identified data objects by their properties as subject area, entity type, or attribute. For activity objects, the Customizing Tool 36 further classifies them as either functions or processes and further determines which are elementary processes.

Activity objects include as an object of the action, a data object. Thus, once an object is classified as an activity object, another object, a data object, is defined. For example, if VISIT PROSPECT is identified as an activity and thus defined as an activity object, PROSPECT is identified as another object and defined as a data object as a result.

The Consultation Tool 34 optionally defines relationship between the objects. If data, the associations with other objects are determined. If a process, the properties are defined such as the number of execution, the expected effects on data objects, etc.

Another option is the ability for the Consultation Tool 34 to define object properties. This definition process is driven by the Object Types Module 42 which includes properties about each object type.

The output of the Modeling Tasks Module 50 results in a Client Model 46. As the Client Models 46 are built, they can be added to the Object Repository 40 or further customized using the Customization Tool 36.

Figure 4:
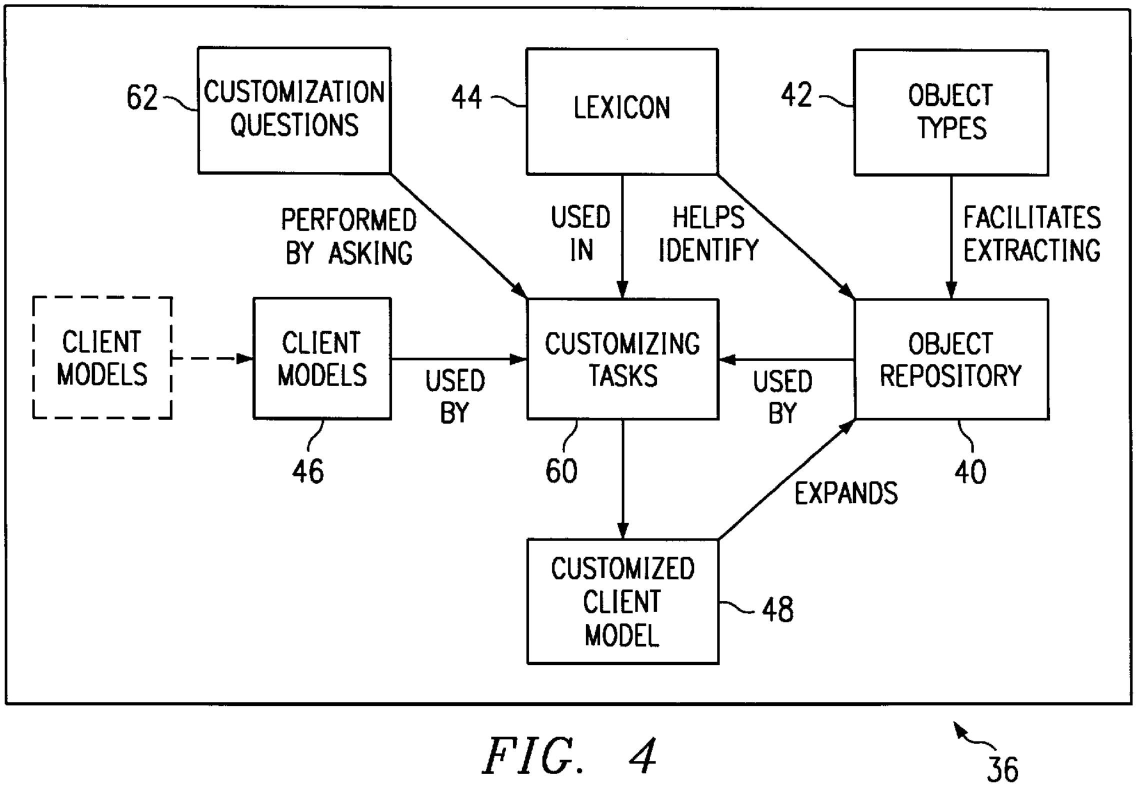
FIG. 4 depicts a block diagram illustrating the Customization Tool of the present invention.

Returning to the customization step performed by the Customizing Tool 36, as shown in detail in the block diagram in FIG. 4, customization tasks are performed by a Customizing Tasks Module 60 using the Client Model 46, which was constructed by the Consultation Tool 34, as initial input The Customizing Tasks Module 60 asks questions which are retrieved from Customization Questions Model 62 such as what does the user call the various entities and functions related to the business. The responses are used by the Customizing Tasks Module 60 to determine aliases and synonyms of the data and activity objects defined by the Consultation Tool 34.

The following is a sequence of questions that are typical of those in the questionnaire presented by the Customization Questions Module 62.

What synonyms do you have for 'x'?

How many like objects should be found?

Do you want to change anything?

Do you want to delete anything?

Do your want to pick a like object?

Do you want to pick a like object's subordinate?

The Lexicon Module 44 is used in the customization step by the Customizing Tasks Module 60 to assist in determining the aliases and synonyms for objects in order to retrieve them from the Object Repository 40. For example, the business may refer to their customers as "clients" whereas some models and questions may refer to them as "customers," "purchasers," "consumers," "patients," "members," "patrons," or any one of several synonyms. Similarly, some businesses use the term "receive" to signify "receiving payment" while others use terms such as "accept," "earn," and "collect."

The Customization Questions Module 62 also continues customizing the Lexicon Module 44 just as the Consultation Tool 34 did. For example, if the enterprise is an airline, the airline may refer to customers as "passengers." Therefore, the Lexicon Module 44 uses the term "passenger" in place of "customer" in all transactions including questions, object names, and any other references during the current processing. Similar development of aliases is done for what the customer calls his products, suppliers, distributors, and so on. Building this list of aliases can lead to a pyramid of aliases and synonyms in the manner that a thesaurus fans out from a root term.

Using the aliases and synonyms, the Customizing Tool 36 seeks and retrieves like objects from the Object Repository 40. The objects retrieved are returned in an interactive process to the user through the Consultation Tool 34 for review. The Customizing Tasks Module 60 presents these objects which the user can add to the Client Model 46, change, rename, or otherwise modify. This fetching, matching, and presenting objects continues object by object until that level is completed for both data and activity analysis. If the user has elected to go to the next level of detail, the processing steps performed by the Customizing Tasks Module 60 are repeated object by object until the level is completed or the process is terminated by the user.

Figure 5:
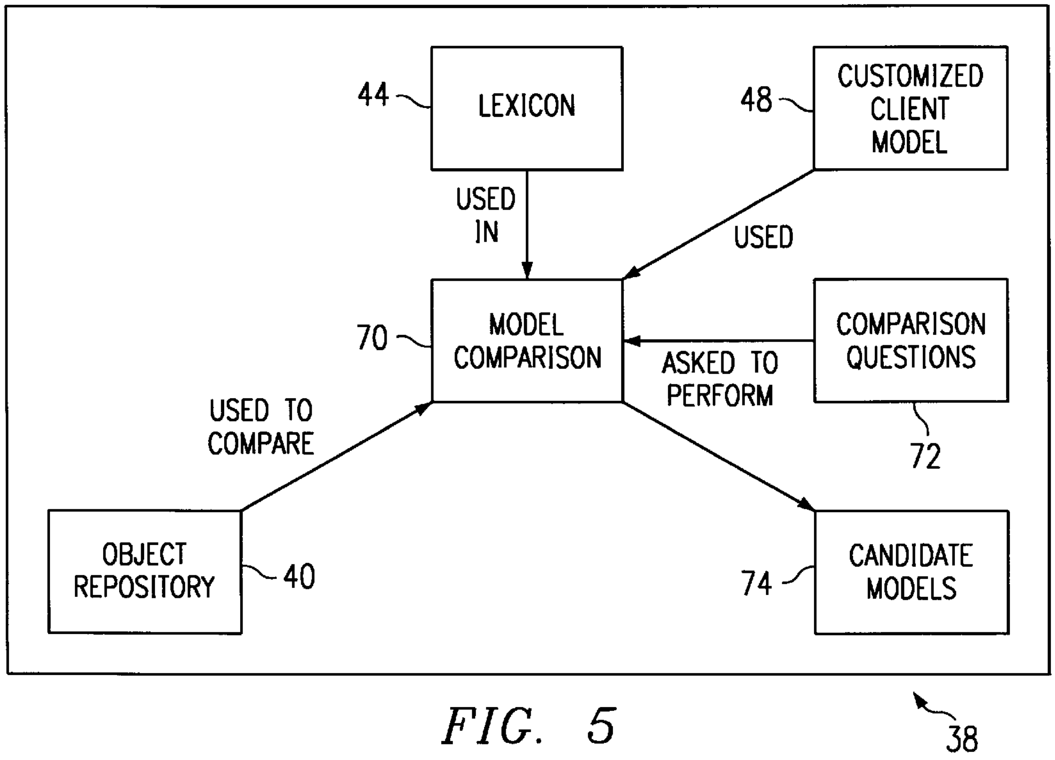
FIG. 5 is a block diagram illustrating the Model Analyzer Tool of the present invention.
Figure 6:
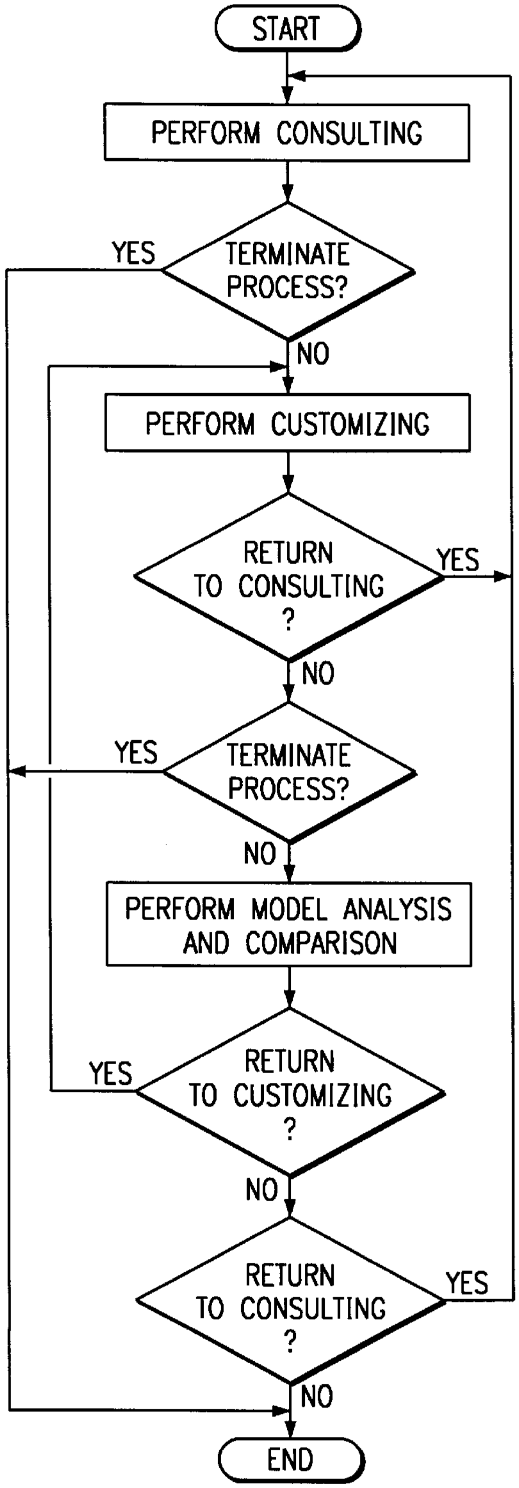
FIG. 6 is a flowchart showing the operation of the present invention.

Returning to the model analysis step as performed by the Model Analyzer Tool 38, shown in detail in FIG. 5, a Model Comparison Module 70 compares the Customized Client Model 48 to existing Client Models 46 that are more complete. The Model Comparison Module 70 seeks and retrieves from the Object Repository 40 one or more Candidate Models 74 of the same class (such as the type of business) for making the comparison. Again, the Lexicon Module 44 is used to convert dialog into terminology necessary for comparing the models.

To perform the comparison, the Model Comparison Module 70 poses questions, using a Comparison Questions Module 72 to the user. The user responses to these questions are used to determine the comparison criteria and to determine the criteria used to determine when to terminate the modeling process. Numerous questions including the following may be asked: "What degree of fit do you want?," "How many models do you want to look at?," and "Do you want to look at only your type of business?".

The Model Comparison Module 70 uses the user responses to facilitate the comparison by selecting objects from the Candidate Models 74. Model analysis is optional and the user may exit at any point in the comparison with a model that matches the level of detail analyzed.

In the following example, a user indicates an interest in laying out the all the requirements for a business which happens to be commercial office cleaning. This is an example of a common business that is like many other business services. In general, the Object Repository 40 includes Customized Client Models 48 of several other similar business services.

In order to start the consultation process, the user first establishes the scope of the business. The system 30 presents to the user and the user responds to questions such as:

Q: What type of business do you operate?

A: Commercial cleaning.

Q: Do you want to model all or part of commercial cleaning?

A: All of it.

In response to the user answers, the system 30 identifies the root, which in this case is Commercial Cleaning. This is used as a starting point for further processing.

Having established that Commercial Cleaning is the root, the system 30 poses more questions to the user in a effort to determine related objects such as:

Q: Who are your customers?

A: Businesses

Next, the user is asked to describe the business by answering questions such as:

Q: Can you outline Commercial Cleaning for me?

A: Yes, we do the following:
  Receive Requests for Cleaning Service.
  Provide Cleaning Service
  Bill for Cleaning Service
  Receive Payment or A: Help me. Provide examples and go to customizing.

In which case the system 30 goes to a list of objects and, with the previously determined information that the business is Commercial Cleaning, seeks and retrieves objects for similar businesses such as building cleaning, laundry and dry cleaning, carpet cleaning, etc. The system 30 then presents one of these retrieved objects as the initial Client Model 46 by substituting Cleaning Service as the object name.

Figure 7:
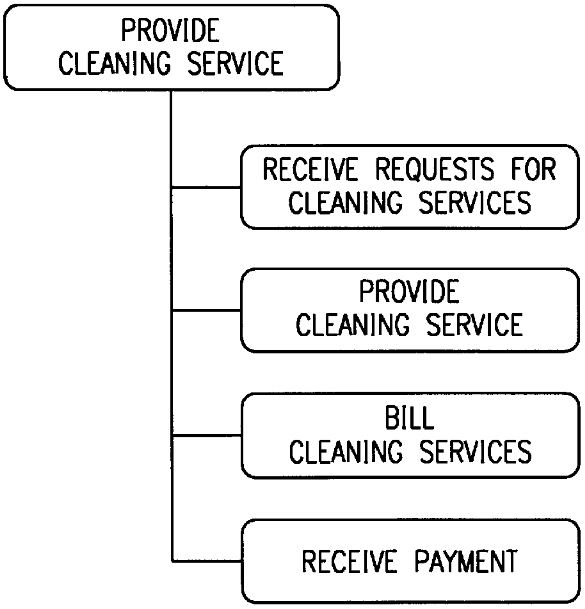
FIG. 7 illustrates an exemplary Activity Hierarchy Diagram (AHD) resulting from a first level of decomposition of exemplary activities.

An Activity Hierarchy Diagram (AHD) down to this first level of decomposition is shown in FIG. 7.

Figure 8:
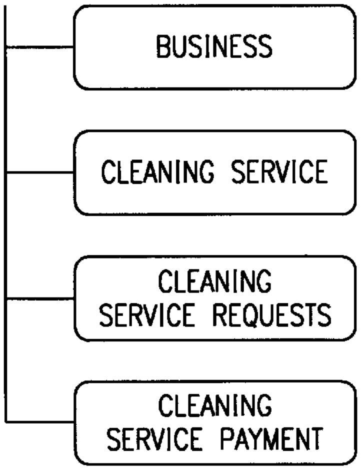
FIG. 8 shows an exemplary data list resulting from the first level of decomposition of exemplary data.

The first level data objects, as illustrated in the AHD in FIG. 7, includes "Businesses" as determined by the question, "Who are your customers?" Also from the AHD in FIG. 7, the objects "Cleaning Service," "Requests," and "Payment" can be established as data objects. The resulting data list for this first level of decomposition is shown in FIG. 8.

The objects determined in this first level of decomposition are sufficient to build an initial Client Model 46. The user can then either exit at this level and use this initial Client Model 46 or continue on with the customizing tasks using the Customizing Tools 36 to customize the initial Client Model 46 to a greater level of detail.

The system 30 completes one level of detail before moving to the next. This feature is built into the questionnaire. Continuing the decomposition at the current level occurs unless the user enters a request to decompose an object at the next level before completing all object decomposition at the current level. Continuing the questioning at the second level of decomposition, the user is asked:

Q: What information do you keep about customers?

A: We keep their:
  Names
  Addresses
  Contacts
  Phone Numbers

This response establishes a second level of data objects under the "Businesses" data object. To establish other second level data objects under "Cleaning Service", the user is then asked:

Q: Outline the information kept about cleaning services.

A: We keep the following information about cleaning services:
  Type of service
  Charge for service
  Time estimate for service Q: Outline the information kept about cleaning service requests.

A: We keep information about the:
  Request estimate
  Service performed
  Customer acceptance Q: Outline the information kept about bills for payment A: We keep information on the:
  Bill
  Service rendered
  Journal entry Q: Outline the information kept about receive payment?

A: We receive the following:
  Payment
  Discount
  Journal Entry

Figure 9:
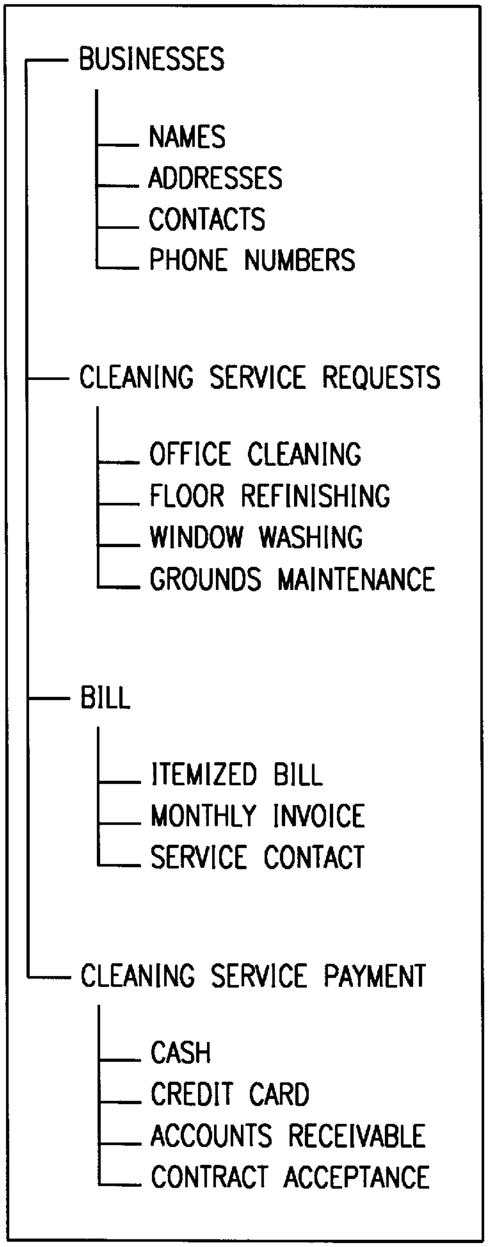
FIG. 9 depicts a data list resulting from a second level of decomposition of the exemplary data.

These responses identify additional data objects at the second level of decomposition, which are shown in the AHD illustrated in FIG. 9.

Figure 10:
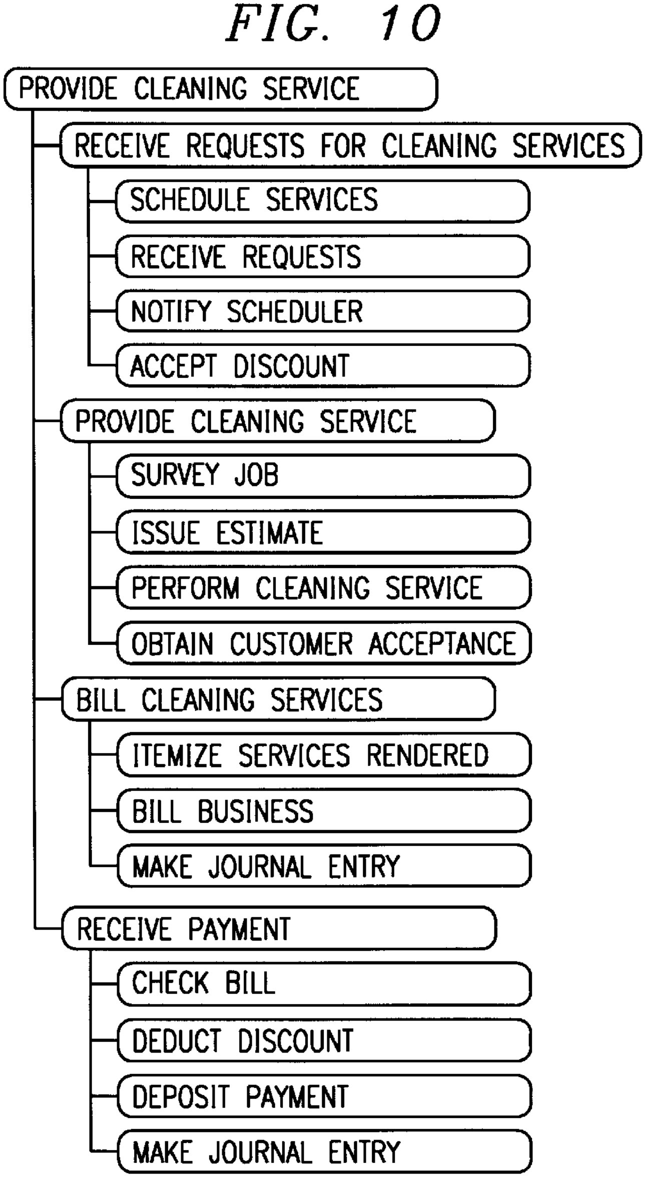
FIG. 10 shows an AHD resulting from the second level of decomposition of the exemplary activities.

The AHD established in the first level of decomposition, shown in FIG. 7, can be decomposed further to the second level as shown in FIG. 10. At each level, activities and data are decomposed in parallel and the decomposition of both are completed for that level before staring on the next level.

The number of objects increases significantly at each succeeding level of decomposition. These objects are added to the Customized Client Model 48 which becomes part of the Object Repository 40 and expands the number of objects within it.

Continuing the customization questions in accordance with the Customization Questions Module 62, the data object "Names" can be expanded by asking:

Q: What customer Names do you maintain?

A: We keep the names of:
  Businesses
  President

Our Contact
Accounts Payable
Treasurer

Because business addresses are a common data object, the model can refer to the Object Repository 40 to obtain:

Street
City
State
ZIP
Country

7The Object Repository 40 provides objects such as Office Phone, Home Phone, Position, and Likes for the Contacts object. Also, for Phone Numbers, the Object Repository 40 indicates a Telephone Number and a FAX Number.

Continuing on, the activity "receive Requests for Cleaning Service" which points to the data object "Requests" leading to the following questions and exemplary user responses:

Q: Outline information kept about type of service.

A: We keep the following information:
Name
Description

Q: Outline charge for service

A: We use:
Amount
Effective Date
Expiration Date

Again, the decomposition stays at this level until decomposition at this level is complete or until the client user terminates the process.

Figure 11:
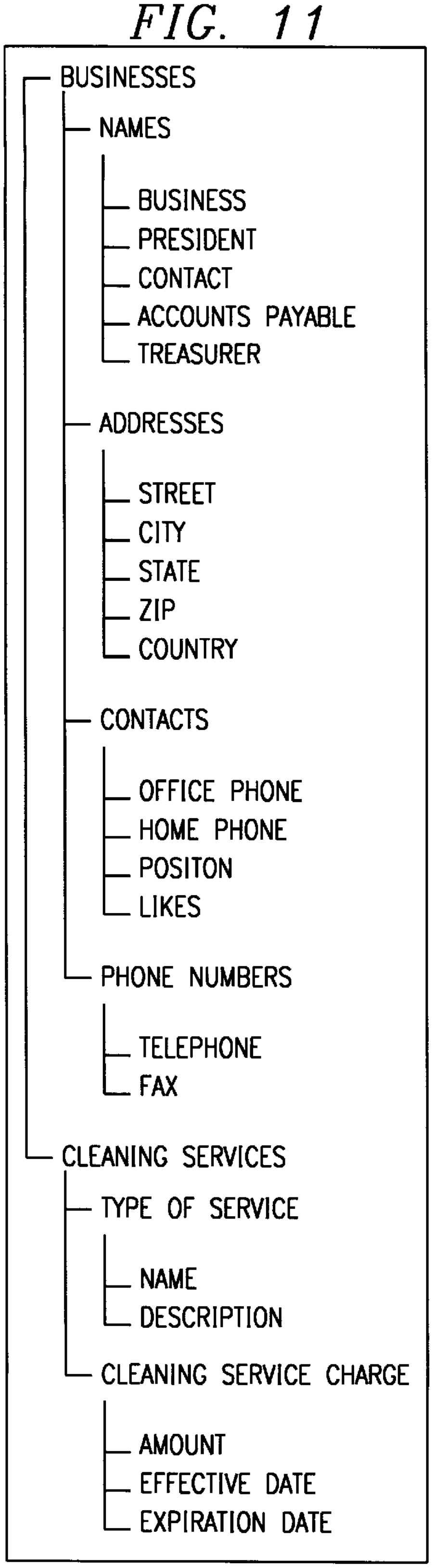
FIGS. 11 and 12 show a data list and AHD, respectively, resulting from a third level decomposition of data and activities.
Figure 12:
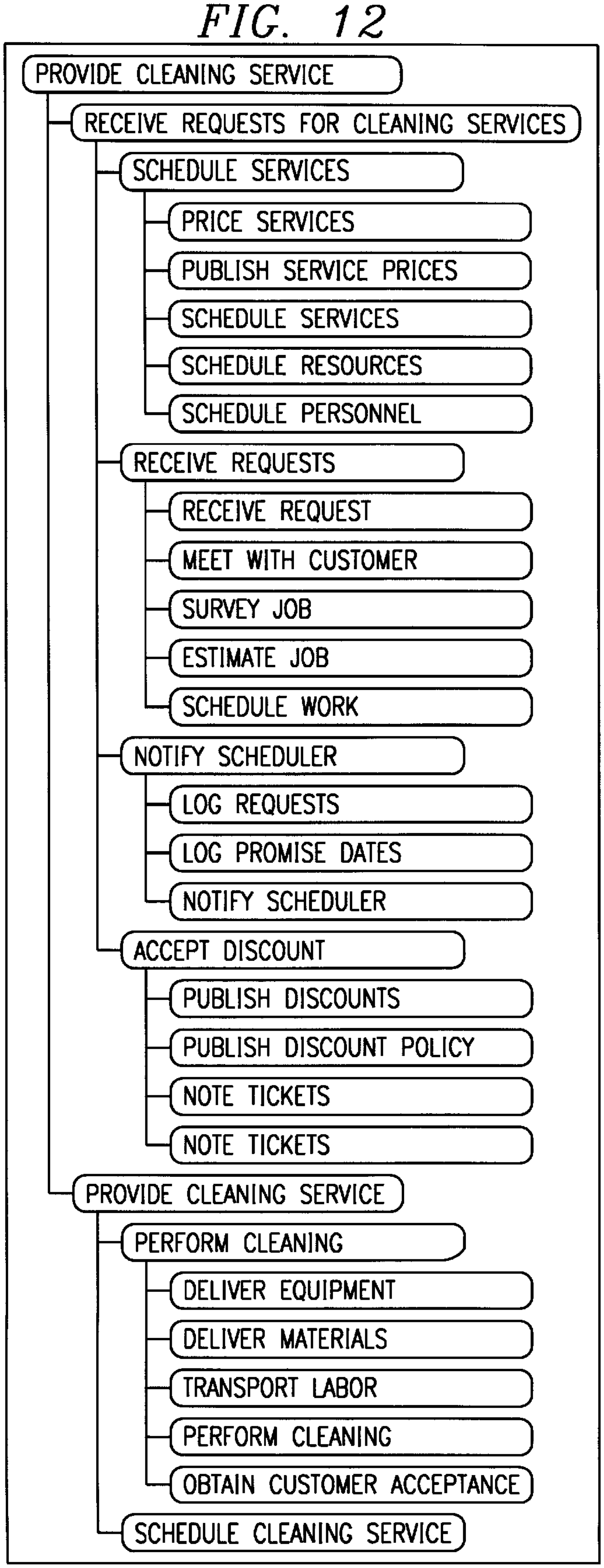

FIGS. 11 and 12 show the third level decomposition of data and activities in the current example.

The user can choose to terminate processing at this point with the model as it now stands or go on to further develop the model using the Customizing Tool 36 and the Model Analyzer Tool 38.

The capability to ask questions and build from the responses hastens the customization process performed by the Customizing Tool 36 and progressively improves the quality of the model as detailing continues.

In the Cleaning Service example, the system 30 asks the user, "Pick what you want to customize." The user responds: "I want to do 'Receive Payment'."

The Customization Tool 36 knows that Receive Payment actually breaks down further, so it doesn't know whether to search for and retrieve matches for Receive Payment or for its subordinates. Therefore, the Customization Tool 36 then asks, "Do you want to customize Receive Payment or its subordinates ("Check Bill," "Deduct Discount," and "Make Journal Entry")?

If the user then elects to customize one of the subordinates, Check Bill for example, the Customizing Tool 36 then responds, "I'm going to look for things that match Check Bill and give them back to you. Then I'll go and find Deduct Discount and show you all the things that are like that." On the other hand, if the user elects to customize Receive Payment, the Customizing Tool 36 then searches for and retrieves matches for Receive Payment and for all of its subordinates. Thus, if the user responds: "Customize It," the Customizing Tool 36 responds, "Okay, Receive Payment-I've got Receive and I've got Payment" The Customizing Tool 36 points the current object first and thus queries the user "What are the aliases and synonyms for Payment?"

Figure 13:
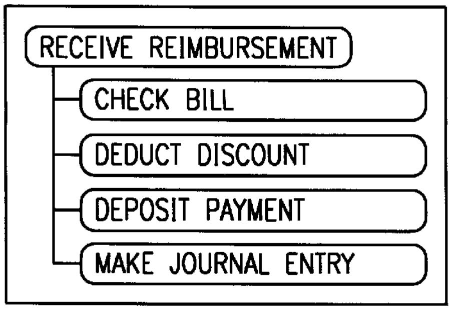
FIG. 13 shows an exemplary AHD for a Receive Reimbursement object.

The user responds, "We call it Reimbursement." The Customizing Tool 36 then searches and retrieves a Reimbursement object, if it exists, from the Object Repository 40. The Customizing Tool 36 also searches for and retrieves a Receive Reimbursement object. The Customizing Tool 36 then displays to the user the Receive Reimbursement object and the subobjects that it breaks down into as shown in FIG. 13.

The system 30 displays this hierarchy and then responds, "Okay, here's Receive Reimbursement, Do you want to customize Receive Reimbursement or its subordinates?"

In viewing the Receive Reimbursement activity object, the user may elect to remain at the current level and then may accept the objects as displayed, or add, delete or modify the objects.

The user responds, "Okay, that looks good, but do you have any synonyms for Check Bill?" From the Thesaurus in the Lexicon Module 44, the system 30 presents in response the list of synonyms for data and activities shown in Table 1 for review.

TABLE 1

List of Synonyms for "Bill" and "Check"

| Data | Activities |
|---|---|
| Account | Aggregate |
| Change | Analyze |
| Estimate | Appraise |
| Fees | Audit |
| Invoice | Calculate |
| Note | Examine |
| Order | Inspect |
| Price | Investigate |
| Slip | Price |
| Statement | Review |
| Ticket | Survey |
| Voucher | Verify |

The user selects synonyms from this listing in Table 1. The user may prefer, for example, to use "Invoice" as the data object for "Bill" but choose to retain "Check", so the activity object becomes Check Invoice. The Customizing Tool 36 then search for and retrieve from the Object Repository 40 like objects.

Figure 14:
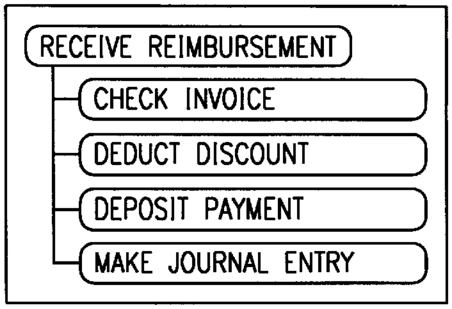
FIG. 14 illustrates the exemplary AHD shown in FIG. 13 after modifications for synonyms.

The AHD shown in FIG. 13 for Receive Reimburse is then modified, resulting in the AHD shown in FIG. 14.

The user may also, for example, respond that Invoices are also referred to by the term Statements. The Customizing Tool 36 then searches and retrieves from the Object Repository 40 like objects for the term Statements as well as for the term Invoices.

In viewing the Receive Reimbursement activity object, the user may then respond that Reimbursement and Check Invoice be decomposed. The Customizing Tool 36 asks, "For how many levels?" The user responds, "Let me see your next level."

The Customizing Tool 36 then searches for and retrieves from the Object Repository 40 objects similar to Reimbursement and Check Invoice. In addition to the aliases Reimbursement, Statement, and Invoice given previously, the Customizing Tool 36 searches for and finds other similar objects including Payment and Bill. The objects found can also be decomposed into additional objects. When these objects are displayed, the user can choose to keep, change, delete, or add to them. When an elementary process is reached, the Customizing Tool 36 indicates there are no more objects to be decomposed for that process.

The Customizing Tool 36 iterates back to the Consultation Tool 34 for decomposition of the objects. The Consultation Tool 34 breaks down the objects level by level and does not proceed to the next level until the current level is complete.

In response to the user questions and directions, the Customizing Tool 36 continuously searches for and retrieves from the Object Repository 40 similar objects for review. The Customizing Tool 36 enables the user to take advantage of the library of existing objects stored in the Object Repository 40 and its ability to use aliases and synonyms in identifying objects.

At any point in the customizing process performed by the Customizing Tool 36, the user can elect to continue customization, return to the Consultation Tool 34, move to the Model Analyzer Tool 38, or use the Customized Client Model 48 to continue with the design phase in the development process.

In the model analysis process performed by the Model Analyzer Tool 38, the Model Comparison Module 70 compares the Customized Client Model 48 to existing models that are more complete. The Model Comparison Module 70 searches for and retrieves models from the Object Repository 40 of the same class (such as the type of business) for making the comparison.

Similar to its use in the Customizing Tool 36, the Lexicon Module 44 is used to convert dialog into terminology necessary for comparing models. The Lexicon Module 44 finds synonyms for objects in order to identify these objects in the Object Repository 40.

The user is asked comparison questions in accordance with the Comparison Questions Module 72 in order to perform the comparison. The user responses to these comparison questions are used by the Model Comparison Module 70 to set the comparison criteria and the criteria used to determine when to terminate the modeling process. Numerous possible questions such are the following may be asked:

What degree of fit do you want?

How many models do you want to look at?

Do you want to look at only your type of business?

Figure 15:
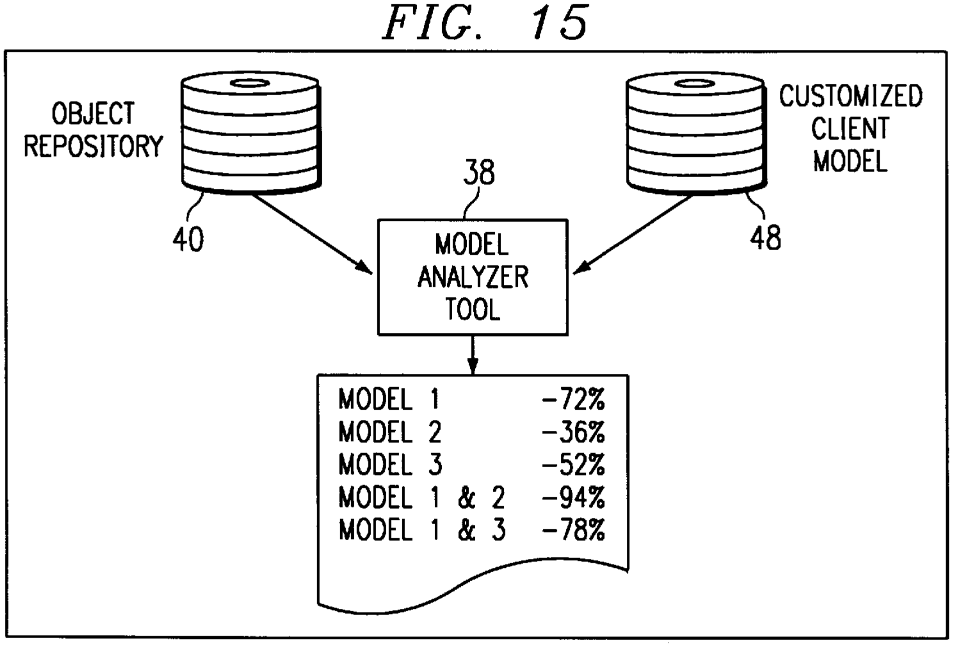
FIG. 15 shows an exemplary comparison using the Model Analyzer Tool of the present invention.

The Model Comparison Module 70 uses the responses to carry out the comparison by selecting Candidate Models 74 from the Object Repository 70. Based on responses to the Comparison Questions Module 72, the Model Comparison Module 70 produces Candidate Models 74 for review by the user. FIG. 15 shows an exemplary comparison by the Model Analyzer Tool 38 which compares the objects in the Object Repository 40 with those in the Customized Client Model 48 created by the user using the Toolset 32. The comparison is performed to the level specified by the user.

Using the Toolset 32, the user builds the Customized Client Model 48 using objects from the Object Repository 40. The Model Analyzer Tool 38 then analyzes and compares the Customized Client Model 48 with more complete models stored in the Object Repository 40.

Based on the user's response to comparison questions such as "How many models do you want to look at?" five models are presented, in this example, as Candidate Models 74. The user can then select the model from the Candidate Models 74, based on the results of the analysis and comparison, which is closest to matching his needs. In FIG. 15, the combination of Models 1 and 2 having a 94% degree of fit is the best choice.

After the analysis and comparison step performed by the Model Analyzer Tool 38, the user again has the option of returning to the Customizing Tool 36 or to the Consultation Tool 34 with any of the Candidate Models 74 or with the Customized Client Model 48 used in starting model analysis.

Several uses for the system 30 of the present invention are contemplated. The system 30 could be installed on a notebook computer and used as a highly portable demonstrator for showing IE modeling which is useful in assisting consultants on calls to customer prospects who have an interest in Composer by IEF™ or in developing Composer by EEF™ applications. Similar demonstrations could be developed for training sessions to show students certain aspects of IE.

The system 30 fundamentally depends on reusing objects and customizing them to fit the user's project. Much of IE's expanding power and effectiveness results from reusing objects. Demonstrating the value and power of this methodology is a possible using the system 30.

The system 30 also provides a vehicle for quickly identifying, customizing and using a large number of reusable objects. Current Composer by IEF™ customers who know the value of reusing objects use the system 30 features of identifying, defining and decomposing objects. The system 30 is also used for developing objects and starter models for segments of the business not already modeled. Those objects and starter models are then stored in the Object Repository 40 for use as components in modeling those business segments.

A primary use of the system 30 is as a set of options for Composer by IEF™. The complete Toolset 32 is offered as an option, or the Consultation Tool 34 is offered separately or with either the Customizing Tool 36 or with the Model Analyzer Tool 38. This product modularity presents selective feature support opportunities that enhance the usability of Composer by IEF™.

Use of the system 30 reduces the time spent in Planning and Analysis and avoids the need to learn and understand underlying database concepts. Additionally, the system 30 enables the customer to experience success soon after starting the project. These early feelings of satisfaction negate the chances of the project bogged down due to increasing complexity.

The system 30 also includes the capability for an enhanced user interface using techniques such as speech and voice recognition. The Lexicon Module 44 includes a preceptor that can be used to facilitate this interface.

Speech and voice recognition are particularly attractive at the beginning of the project when, for example, executives who have purchasing authority are most likely to be involved in IE. The use of voice and mouse input is especially appealing for personnel who do not have extensive keyboard experience or skills and prefer the friendlier voice and mouse interfaces.

Thus, by applying the present invention to information planning and analysis, an organization gains several benefits which include:

(1) The ability to apply business process re-engineering principles to IE by having the customer directly interacting with the process;

(2) The capability to build business models without showing the details of the method, thus insulating the less technically oriented customer;

(3) Ability to respond to a shortened business cycle by shortening the IE development life cycle;

(4) The capability to move quickly to implementing the design which is where the user directly interacts with the system;

(5) The ability to start development with a model already at some state of completion;

(6) The ability to reusing existing models, a technique that increases the speed of building the system; and (7) The resources to increase the quality of the system by integrating pre-defined, pre-tested models.

OTHER EMBODIMENTS

Although the present invention and its advantages have been described in detail, it should be understood that various changes, substitutions and alterations can be made herein without departing from the spirit and scope of the invention as defined by the appended claims.

APPENDIX A: PARALLEL DECOMPOSITION

This appendix presents parallel decomposition of data objects and activity objects IE.

IE is a top-down, divide and conquer methodology. Activity decomposition is depicted via an Activity Hierarchy Diagram (AHD). Data decomposition is depicted via a Data List, also referred to as a Data Decomposition Diagram in versions of Composer by IEF™ before version 5.0.

The concept of meta rules and meta models form the foundation for parallel decomposition and underlies the concept of knowledge based planning and analysis.

A meta rule is a rule about a rule. They are a type of rule in expert systems used to specify conditions under which certain rules are to be followed instead of others. The meta rules are the database design for Composer by IEF™. The term “meta” denotes recursion (the ability of a procedure to repeat itself until a specified condition is met) and self-definition.

The meta rules define a model of models. Composer by IEF™ is used by customers to build models of their businesses and/or systems. These models are captured for Composer by IEF™ transformation into the meta model.

At the meta model level, entity types are called object types. Attributes at the meta model level are called properties. Relationship memberships are called association memberships. The specific contents of the meta model (all the object type definitions, association memberships, properties, and so forth) are documented in an Object Decomposition Report.

Decomposition of data/activities assists in the identification and confirmation of activities/data. Additionally, the construction of one model confirms objects in the other model. For example, if IDENTIFY PROSPECT is a process in the Activity model, then PROSPECT appears as an entity type in the data model.

The example above demonstrates the direct relationship between the objects in both models, that is, the object of an action (activity) is data. To effectively develop models in parallel, each model is used to identify and confirm objects in the other. Symmetry in development is used to maintain a consistent level of detail across models.

The concept of cohesion reinforces the idea that there is a relationship between the decomposition of data and activities. Activities that are subordinates of a common parent have a high degree of cohesion because they act on a common set of data. Data objects within a subject area possess a high degree of cohesion because of the relationships formed by activities that create occurrences of the entity types.

The concept of coupling means that there is a minimum number of relationships among objects that are not siblings. It also means that there are fewer relationships among entity types in two different subject areas that among entity types in the same subject area.

In view of the concepts of cohesion and coupling, data and activities are decomposed in parallel.

The following terms, function, primitive function and process, relate to Activity decomposition.

A function is a group of business activities that together completely support one aspect of the enterprise. Each function describes something the enterprise does, independent of the structure of the organization. Functions are high-level business activities. The group of activities that compose a function are generally related because they use similar business data. Examples of functions include Sales, Procurement, Recruiting, Market, and Analysis.

A primitive function is a leaf level function, i.e., one that decomposes into processes. A primary focus is to move a single entity type through its life. A secondary focus is on entity types whose occurrences are created as the single entity type moves through its life.

A process is a business activity or group of activities that move an entity of some entity type from one state in its life to another and/or that produces a view of information that is received by an external object outside the area being analyzed. Examples of such processes include Identify Prospect, Qualify Supplier, Interview Applicant, and Conduct Market Survey.

While it sometimes appears that the only difference between a function and a process is the grammatical form of the name, the name is not as important as the level of detail that each represents and the data objects that a function and a process act on.

The similar business data that a function acts on is a collection of entity types and the life cycles that the entity types pass through. A process focuses on a single life cycle state of an entity type. (NOTE: this is not to say that a process only acts on a single entity type.)

EXAMPLE:

The BENEFITS ADMINISTRATION function partially decomposes into CLAIMS PROCESSING and ISSUE MANAGEMENT. The data that each of the subfunctions process include the entire life cycle of the entity types CLAIM and ISSUE. They are therefore classified as the functions which BENEFITS ADMINISTRATION processes within the life cycle of both entity types. The activity ISSUE MANAGEMENT decomposes into IDENTITY ISSUE, INVESTIGATE ISSUE, and RESOLVE ISSUE. Each of these activities deals with a single state of the entity type ISSUE and are therefore classified as processes.

This difference forms an effective boundary between the Planning and Analysis stages of IE by identifying a major change in the level of detail being analyzed.

Two methods of activity decomposition are used in breaking down activities. One method, Specialization is used at higher levels of activity analysis, such as during an ISP, and continues until a discernable sequence (life-cycle) of activities can be identified. The other method, Life-Cycle, includes a first level which deals with the sequence in which collections of entity types that functions focus on come into existence. This continues into process decomposition where the focus is on individual life cycle states of an entity type and the sequence in which entities pass through the states.

The mission of any enterprise includes the delivery of some service or product to a customer/client Functions support one aspect of furthering the mission of the enterprise. Therefore, the first level of decomposition directly supports the mission, or directly supports objectives which directly support that mission. Table 2 below depicts a first level decomposition that supports any enterprise.

TABLE 2

Functions Which Can Support Any Enterprise

| Function | Description |
|---|---|
| Marketing | Enticing someone/thing (customer) outside the area being analyzed to obtain the service/product offered. |
| Sales | Obtaining an agreement from the customer to obtain the service/product being offered. |
| Manufacturing/Service Development | Producing the service/product. |
| Distribution | Delivering the service/product to the customer. |
| Receiving | Obtaining the necessary items needed to product and support the production of the service/product. |
| Customer Service | Continuing to provide value to the service/product after the sale to a customer. |
| Enterprise Structuring | Providing the infrastructure necessary to support the activities that contribute to the development and delivery of the service/product. |
| Human Resources | Obtaining and developing the resources necessary to support the production and delivery of the service/product to the customer. |
| Procurement | Obtaining material necessary to produce and support the production of the service/product. |
| Technology Development | Developing the service/product and the technology necessary to support the production of the service/product. |

If the goal of a project is to analyze the entire enterprise or a portion of the enterprise, the functions listed in Table 2 can serve as a starting point, or as the first level of decomposition.

Referring back to the definition of a function, it is clear that the functions listed in Table 2 do not act on a single entity type, let alone a single state of an entity type's life. Therefore it is safe to identify them as functions.

Figure 16:
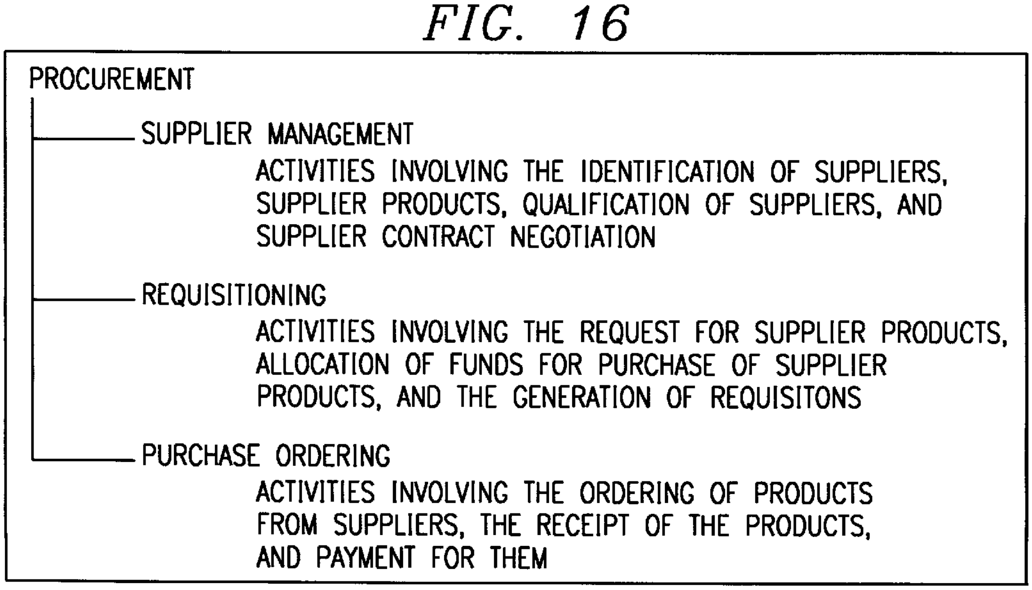
FIGS. 16–20 depict exemplary functional decompositions using the present invention.

The next level of functional decomposition concentrates on identifying further levels of specialization within each first level function. At this second level the sequence in which the functions occur begins to emerge. This is where dependency analysis can be used to confirm that this level of decomposition is complete and correct. At this level of decomposition, high-level entity types (so called because they appear at high levels of the decomposition) are identified but their life cycles are not. FIG. 16 assists in explaining this concept.

The level of decomposition illustrated in FIG. 16 focuses on the specialization of activities within the Procurement function. A sequence in the occurrence of the activities can be seen and high-level entity types appear. This is a characteristic of function at this level, i. e., dependencies can be discerned and high-level entity types begin to appear. In the example shown in FIG. 16, SUPPLIER MANAGEMENT is followed by REQUISITIONING which is followed by PURCHASE ORDERING. The high-level entity types appearing at this level are SUPPLIER, REQUISITION, and PURCHASE ORDER.

The next level of decomposition moves away from specialization and involves the movement of single entities of some type, and entity types which are related to them, through their life cycle. Depending on the complexity of the second level function, the result is the final, third level, of functional decomposition, or the fourth level of decomposition.

The functions shown in FIG. 16 could by mistakenly identify as primitive. They are not. By examining the definition of SUPPLIER MANAGEMENT to help identify subordinate activities, SUPPLIER ADMINISTRATION and SUPPLIER PRODUCT IDENTIFICATION are found. There are multiple entity types, such as SUPPLIER and SUPPLIER PRODUCT that are moved through a defined cycle by the SUPPLIER MANAGEMENT function. This example demonstrates the benefit of considering the next level of decomposition before making a decision that the lowest level function has been reached. To illustrate this concept, the function SUPPLIER MANAGEMENT is decomposed in FIG. 17.

Figure 17:
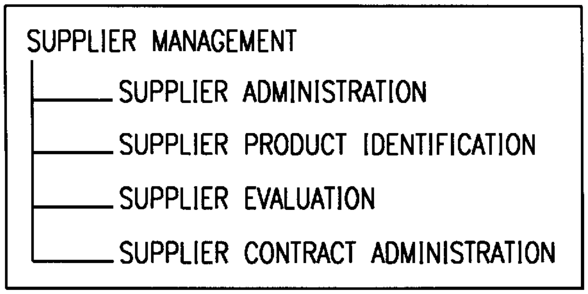

Each function shown in the SUPPLIER MANAGEMENT functional decomposition shown in FIG. 17, focuses on a single entity type and entity types that are related to it. In the example in FIG. 17, the single entity type are SUPPLIER, SUPPLIES PRODUCT, SUPPLIER EVALUATION, and SUPPLIER CONTRACT. Additionally, defined dependencies between the functions are very easy to discern. In the example shown in FIG. 17, SUPPLIERS must exist before SUPPLIER PRODUCTS can be created. SUPPLIER CONTRACTS depend on the existence of SUPPLIER PRODUCTS and, in parallel, SUPPLIER EVALUATIONS depends on SUPPLIER PRODUCTS and the DELIVERIES and the PRICES paid for SUPPLIER PRODUCTS. DELIVERIES and PRICES are created by other functions in the PROCUREMENT function.

The next level of decomposition results in processes. Each process at this first level of process decomposition focuses on a single state of the entity type identified by the lowest level (primitive) function. Focusing on a single state does not mean that other entity types are not used (READ or UPDATED) by these processes. Subsequent levels of processes deal with the entity type identified by the primitive function and entity types related to it. These levels are discussed hereinbelow in conjunction with parallel Decomposition of Data and Activities.

Figure 18:
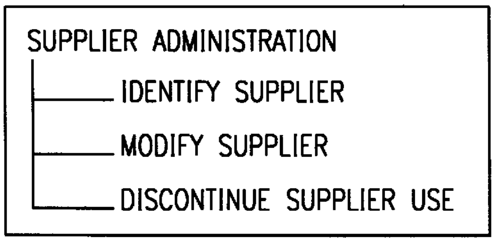

FIG. 18 depicts the decomposition of the primitive function SUPPLIER ADMINISTRATION. Each process at this level deals with a single state of supplier.

The ten functions at the first level as described above form a sufficient starting point for a function decomposition that was produced during an ISP project. But, what if an ISP is not the starting point for the project? How should decomposition be initiated and continued?

Decomposition is initiated by identifying the subset of first level functions that are included in the project The functions at the next level of decomposition are then identified and so on until each primitive function is identified. Data dependencies are identified at each level subsequent to the first level to ensure that all the required functions are then decomposed in two levels; the second level of decomposition does not have to be graphically depicted on the Activity Hierarchy Diagram. The description of each first level process is sufficient to identify most of the processes at the second level of process decomposition.

The number of levels of process decomposition is a measure of the complexity of the primitive function being decomposed. A primitive function typically decomposes into three levels of processes, however it can vary from one to four levels depending on the complexity of the primitive function. The complexity can also be measured by the number of entity types that are created by the primitive function. The number of entity types created by a primitive function is typically eight but it can vary from six to ten.

Another measure of the complexity is the number of elementary process that result from decomposing the primitive function.

Figure 19:
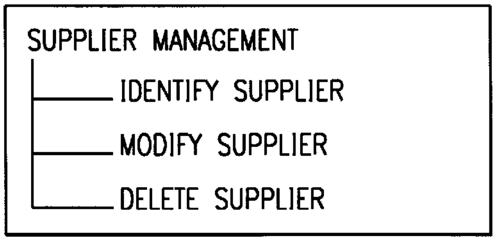
Figure 20:
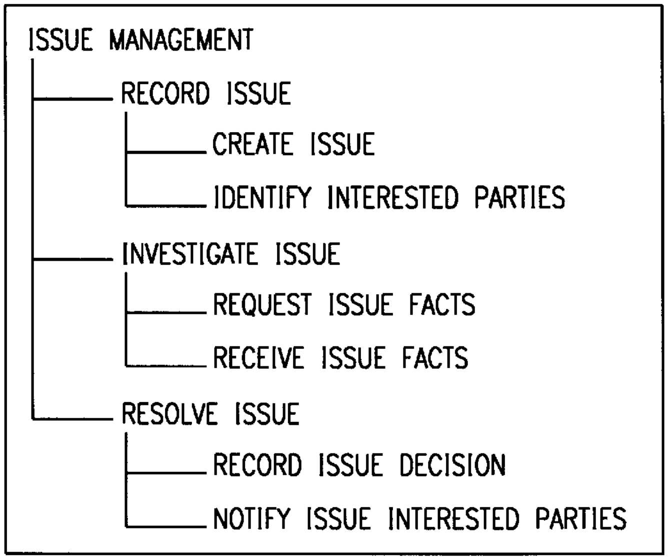

FIGS. 19 and 20 show how the complexity can be measured. FIG. 19 continues the decomposition of the PROCUREMENT function. FIG. 20 introduces a new primitive function ISSUE MANAGEMENT. Examples of both functions and their associated data are used hereinbelow.

The primitive function shown in FIG. 20 is classified as simple. The enterprise that uses it is not complex. The enterprise may only be interested in the supplier's name, address, and a single contact, not all the detail shown in FIG. 20. Again, the level of complexity can be measured by examining the number of levels of decomposition and the number of elementary processes.

The primitive function shown in FIG. 20 decomposes into only six elementary processes. It represents the initial effort at decomposition and depicts the life cycle of the ISSUE entity type. Upon further analysis, additional non-elementary and elementary processes may be discovered. These new processes will probably center on modification and deletion type activities, but even if the number doubles, the total number of elementary processes will only be twelve. This function can be classified as simple when compared to an average primitive function that decomposes into 24 elementary processes.

The number of entity types that ISSUE MANAGEMENT creates is four. ISSUE, ISSUE INTERESTED PARTY, ISSUE FACTS, and ISSUE DECISION. Using the number of entity types created as the complexity measure confirms that this primitive function is simple.

Note that the first level of decomposition follows the entity type ISSUE through its life. The next level focuses on a single state and associated entity types.

Turning now to data decomposition, the terms Subject Area, Subject Area Association, Central Entity Type, and Primitive Subject Area are useful.

A Subject Area is a natural subdivision of an enterprise centered on a major resource or activity of the enterprise. In other words, a Subject Area is a grouping of objects that the business handles. It consists of a cohesive group of entity types and their relationships that are used by common businesses activities. From this definition it can be concluded that the common business activities being referred to are business functions. Therefore, the business functions act on subject areas of data, not individual entity types. Examples include MANUFACTURING, SALES, EMPLOYEES, and COMPETITORS.

A Subject Area Association is a relationship between subject areas. For example, SUPPLIERS provide SUPPLIER PRODUCTS.

A Central Entity Type is an entity type that is taken through its life cycle by the processes that make up a primitive function. There is only one central entity type for each primitive function. Examples include:

| Central Entity Type | Primitive Function |
|---|---|
| INTERVIEW | INTERVIEWING |
| SEARCH FIRM | SEARCH FIRM ADMINISTRATION |
| CUSTOMER SALES ORDER | CUSTOMER SALES ORDERING |

A Primitive Subject Area is a collection of entity types consisting of the central entity type and entity types whose occurrences are created as the central entity type moves through its life cycle. The existence of occurrences of entity types that are not central are dependent on the existence of occurrences of the central entity type. A primitive subject area is the focus of a primitive function. It contains six to ten entity types an average of eight. Each of these entity types is described by an average of five attributes. This definition may seem to imply that the central entity types can only be independent entity types. While independent entity types can also be central to a primitive subject area, other classifications, such as dependent (SUPPLIER PRODUCT) and high level associated entity types (ORDER), can also be central The concept of decomposition of data began when difficulties were encountered trying to comprehend large ERDs. It was believed that there had to be some way to organize the ERD to facilitate the understanding of it. Subject areas were an effective way to group entity types together to organize the ERD. The next step was to identify some rules for grouping the entity types. The rules for grouping are found throughout this section. In addition to the rules for grouping, there is a technique similar to function decomposition, using specialization and life-cycle methods, that can be used to decompose data. This technique and associated methods are also included in this section.

The decomposition concept in IE is based on the principle of high cohesion and low coupling. From a data perspective, the degree of cohesion can be measured by the number of subject area associations or entity type relationships that exist among siblings at the same level of decomposition. It can also be measured by extensive dependencies between sibling data objects. (An existence dependency between data objects means that the creation of occurrences of one enables the creation of occurrences of the other.) As decomposition proceeds the degree of occurrences increases while the degree of coupling decreases. The degree of coupling can be measured by the number of associations or relationships that exist between entity types contained within different subject areas and the existence dependencies that exit between entity types contained within different subject areas.

Figure 21:
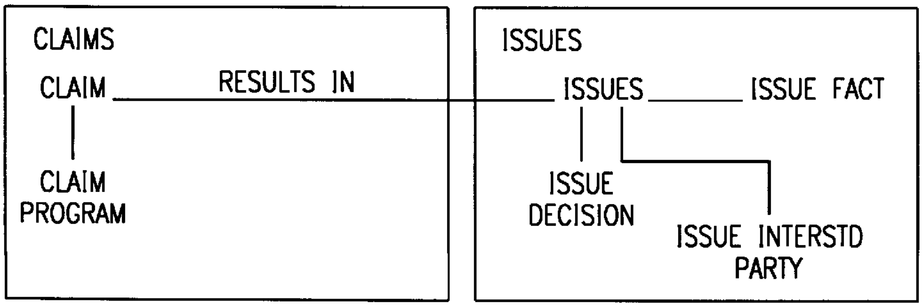
FIGS. 21–24 illustrate examples of subject area decompositions.

As shown in FIG. 21, there is only a single relationship between the entity types in the subjects areas CLAIMS and ISSUES which implies a low degree of coupling. In the ISSUES subject area, all of the entity types are directly related to the central entity type ISSUE implying a high degree of cohesion. Additionally, occurrences of these entity types are all created by the processes that make up an ISSUE MANAGEMENT primitive function confirming a high degree of cohesion for the entity types in this subject area To obtain a high degree of cohesion and a low degree of coupling, data is decomposed using the same concepts as in decomposing functions. Decomposing begins with decomposition by specialization and move toward decomposition by life cycle.

Since functions focus on subject areas and functions are progressively decomposed, subject areas are also progressively decomposed. The decomposition of subject areas follows (parallel) the decomposition of functions at each level. Examples of decomposition are presented in this section. The concept of parallel decomposition is presented in the next section.

The decomposition of data into subject areas begins with decomposition by specialization and moves toward decomposition by life cycle.

The first level of data decomposition consists of subject areas that support a specialized area of the enterprise, such as SALES, MANUFACTURING, HUMAN RESOURCES, and PROCUREMENT. As can be seen, these names follow the names for the first level of function. There is specialized data that supports each of the first level functions and the names correspond. These are not central entity types whose life cycles can be defined.

The next level of data decomposition concentrates on identifying further levels of specialization within each first level subject area. At this second level, the sequence in which the data is created begins to emerge and associations between the subject areas can be identified. Also, high-level entity types begin to appear.

EXAMPLE:

PROCUREMENT decomposes into SUPPLIER MANAGEMENT,

REQUISITIONING, AND PURCHASE ORDERING.

The associations between the subject areas are:

SUPPLIER MANAGEMENT supports REQUISITIONING,

REQUISITIONING enables PURCHASE ORDERING

The subject areas above could be mistakenly identified as primitive. They are not While SUPPLIER is found to be an entity type in the SUPPLIER MANAGEMENT subject area, there are several other entity types, such as SUPPLIER PRODUCT, that belong to this subject area and move through a defined life cycle. Thus, there are two high-level entity types which warrant their own subject area This example demonstrates the benefit of considering the next level of decomposition before making a decision that the lowest level subject area has been reached.

The next level of decomposition moves away from specialization and involves entity types that move through a life cycle. Depending on the complexity of this second level subject area, the result will be the final or third level of subject area decomposition, or may result in fourth level of decomposition.

EXAMPLE:

SUPPLIER MANAGEMENT decomposes into SUPPLIERS, SUPPLIER PRODUCTS, SUPPLIER CONTRACTS, and SUPPLIER EVALUATIONS The associations between the subject areas are:

SUPPLIERS provide SUPPLIER PRODUCTS, SUPPLIERS enter into SUPPLIER CONTRACTS, SUPPLIER CONTRACTS specify pricing for SUPPLIER PRODUCTS, SUPPLIERS measured by SUPPLIER EVALUATIONS The lowest level of subject area is called the primitive subject area This level focuses on the central entity type and the entity types whose occurrences are created as the central entity type moves through its life.

Entity types are drawn into a primitive subject area because the activity or activities that create occurrences of the entity type are part of the decomposition of the primitive function that focuses on the subject area or because the entity type is dependent on the central entity type.

EXAMPLE:

The entity type ORDER LINE PRODUCTION SCHEDULE (the portion of the PRODUCTION SCHEDULE allocated to an ORDER LINE) is the intersection of ORDER LINE and PRODUCTION SCHEDULE. Two subject areas CUSTOMER SALES ORDERS and PRODUCTION SCHEDULES exist. The ORDER LINE PRODUCTION SCHEDULE's occurrences are created by the CUSTOMER SALES ORDERING primitive function, not the PRODUCTION SCHEDULING primitive function. If therefore belongs in the CUSTOMER SALES ORDER primitive subject area.

The complexity of a subject area can be measured using a method similar to that used for measuring the complexity of a function. That is, by comparing the number of subject ahead or entity types that it decomposes into on average. An average primitive subject area consists of eight entity types. Therefore, a primitive subject area with fewer entity types is classified as simple, while a primitive subject area with more entity types is complex.

Also, as with levels of function and process decomposition, the number of levels of subject areas or entity types is a measure of the complexity of the subject area. As before, the number of levels and the number of subordinate subject areas or entity types are directly related.

Typically, there are three levels of subject areas and three levels of entity types (levels of entity types are discussed next) that correspond directly to the number of levels of functions and processes. A primitive subject area with less than three levels of entity types moves toward simple; a primitive subject area with more than three levels of entity types moves toward complex.

Figure 22:
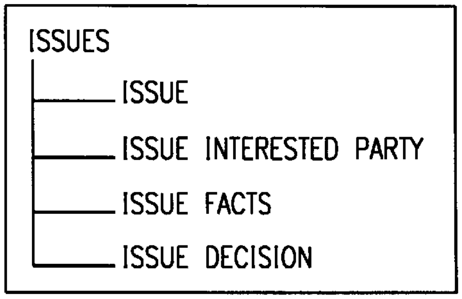
Figure 23:
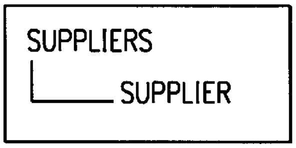

Previous examples have demonstrated average to complex primitive subject areas. The examples shown in FIGS. 22–23 illustrate simple primitive subject areas.

Comparing these subjects area decompositions to the average of eight entity types per subject area illustrates that these are simple (ISSUES) and very simple (SUPPLIERS) subject areas. The degree of complexity is directly related to the degree of complexity for the corresponding function, as discussed hereinabove in relation to the decomposition of activities. This verifies the relationship between the decomposition of activities and the decomposition of data.

Once the central entity type for a primitive function has been identified, the other entity types within the primitive subject area can be categorized based on their relationship to the central entity type. The central entity type is categorized as a level one entity type. Any entity types that have a mandatory relationship with the central entity type are also at this level. This means that occurrences of these entity types are created at the same time as occurrences of the central entity type.

The first level of entity types can also consist of characteristic or life cycle partitioning including subtypes.

EXAMPLES:

SUPPLIER

PRODUCT

PRIMARY EDUCATION PROGRAM (subtype of EDUCATION PROGRAM)

ORDER and ORDER ITEM

SHIPMENT and SHIPMENT ITEM

ACCIDENT and ACCIDENT VEHICLE

INTERVIEW and INTERVIEW CANDIDATE

The secondary level of entity type consists of entity types whose occurrences are dependent on the creation of level one entity type occurrences, but do not have to be created at the same time.

EXAMPLES:

SUPPLIER ADDRESS location for SUPPLIER

PRODUCT CHARACTERISTIC describes PRODUCT

ORDER LINE SCHEDULE specifies delivery for ORDER LINE

SHIPMENT SCHEDULE specifies delivery of SHIPMENT

SHIPMENT and SHIPMENT ITEM

ACCIDENT DESCRIPTION describes ACCIDENT

INTERVIEWER assigned to INTERVIEW

Third (fourth) level of entity type consists of entity types whose occurrences are dependent upon the existence of occurrences of second (third) level entity types. Entity types at this level depend on the complexity of the primitive function and subject area being decomposed and, therefore, may not exist for all primitive functions.

EXAMPLES:

SUPPLIER ADDRESS ROLE responsibility of SUPPLIER ADDRESS

ORDER LINE SCHEDULE DEMAND matched to PRODUCT DEMAND

INTERVIEWER RESPONSIBILITY assigned to INTERVIEWER

Figure 24:
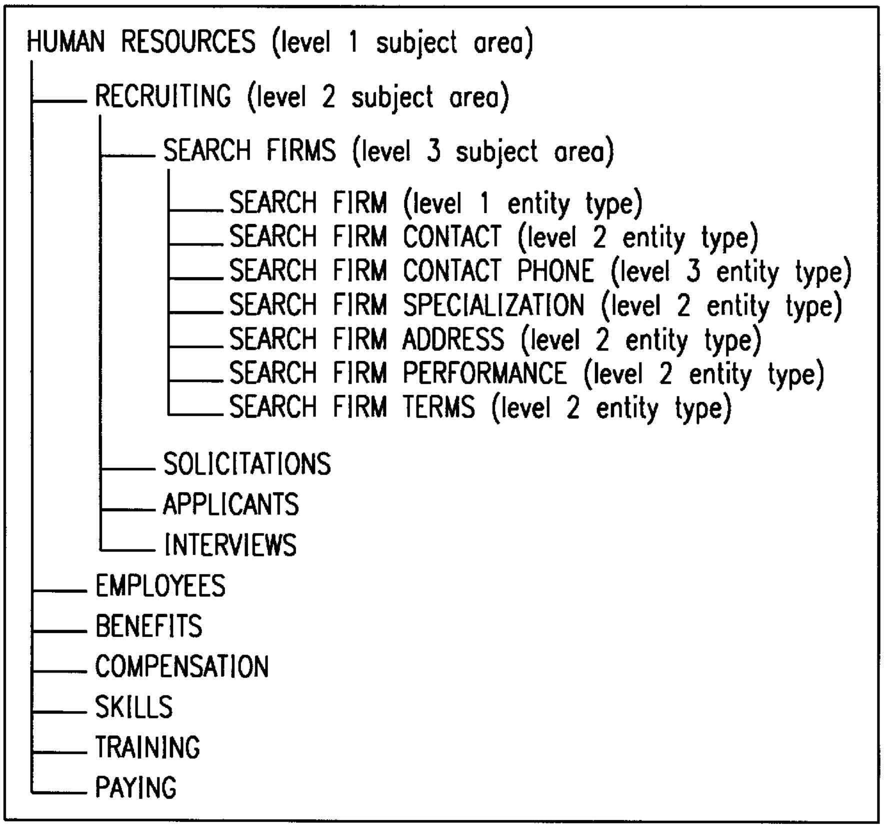

FIG. 24 is a data decomposition diagram illustrating a data list for the subject area Human Resources. It represents a partial decomposition of this subject area with only the SEARCH FIRMS primitive subject area fully decomposed.

The diagram shown in FIG. 24 can also be extended to show entity subtypes, relationships, and attributed. Entity subtypes are shown at the level below entity types. Relationships and attributes are shown at the level below entity types or entity subtypes.

There are several benefits of including the data decomposition diagram in the IE methodology. First, it provides a companion diagram that can be developed in parallel with the AHD. (This will be discussed at length hereinbelow.) It also provides an indented list of data without graphically depicting relationships. Thus, it is easier to construct that the ERD and the ERD can be constructed from it. The data decomposition diagram is also a more compact diagram that the ERD.

Most important is it provides a means to show the progressive development, via decomposition, of the data that supports the area being analyzed.

As can be seen from the discussion hereinabove on activity and data analysis, it is very difficult to divorce the analysis of activities from the analysis of data. The analysis of one requires knowledge of the other to be complete. For this reason it makes sense that as one is decomposed, the other is be decomposed. Hence the concept of parallel decomposition. The following discussion explains the basis for performing these activities in parallel and shows examples of how the decomposition can be accomplished.

From the definitions of functions and processes and the definitions of subject areas and entity types, it is natural to relate functions to subject areas and processes to entity types. Functions act on collections of data (entity types) that are grouped into subject areas. Processes transform data (occurrences of entity types) by moving an entity of some type from one state in their life to another. Therefore, the decomposition of functions beginning with specialization and ending with entity types that move through a defined cycle, can be done in parallel.

As activities are decomposed, data that the activities act on is identified or the need for data already present in the data model is confirmed. As data is decomposed, activities that use data are identified or confirmed. Thus, data and activity decomposition proceeds in parallel, level by level.

Parallel decomposition is illustrated hereinbelow using the ISSUE MANAGEMENT primitive function and the ISSUES subject area discussed hereinabove.

EXAMPLES:

ISSUE MANAGEMENT decomposed into IDENTIFY ISSUE, INVESTIGATE, ISSUE, and RESOLVE ISSUE. These identified/confirmed the central (level 1) entity type ISSUE and depict an ISSUE's life cycle.

The second level processes identity/confirm the second level entity types ISSUE INTERESTED PARTY, ISSUE FACTS, and ISSUE DECISION which are directly related to and dependent upon ISSUE.

The above is a simple example of parallel decomposition, but it illustrates the concepts presented throughout. It confirms the decomposition of activities, which included levels of functions and processes, and the decomposition of data, which included levels of subject areas and entity types, and the respective examples shown, As a result, it becomes apparent that the decomposition of each should be done in parallel.

Functions that specialize in supporting some objective of the enterprise also create and use specialized data. That is not to say that these functions do not use data that is created and used by other functions. They do! Similarly processes that focus on a state in the life cycle of some entity type may also use entity types that are created outside of their scope.

EXAMPLES:

The function MARKETING uses data from the subject area PRODUCTS that is created by the TECHNOLOGY DEVELOPMENT function as well as data from the MARKETS subject area whose data is created by it.

The process PREPARE MARKET SURVEY uses the entity type PRODUCT as well as creating occurrences of the entity type MARKET SURVEY.

The parallel decomposition concept stems from the fact that analysis of either data or activities requires a knowledge of one to complete the analysis of the other. In Composer by IEF™, the AHD and the Data List are companion diagrams that show the progressive decomposition of activities and data Also, the Activity Dependency Diagram (ADD) and the ERD are similar diagrams that both show the relationships between objects. The ADD shows these relationships via dependencies and the ERD shows these relationships via relationships.

In parallel decomposition, data that activities act on is identified or the need for data already present in the data model is confirmed. As data is decomposed, activities that use the data are identified or confirmed. Thus, data and activity decomposition can proceed in parallel, level by level.

At each level of development, there are data-related and activity-related objects that have a direct correspondence to each other. For example, a level two entity type is the object of a level two process action.

During the Planning stage, decomposition proceeds until level one process and central (level 1) entity types are identified. Level one is a sufficient level of detail to develop during a Planning project and serves as an effective starting point for an Analysis project. During a Planning project, processes and entity types at level two may be discovered. These level two processes and entity types are documented, but are not developed further.

If the Planning project has not been completed, then the decomposition techniques discussed herein are carried out for the area being analyzed.

Since there is a one to one relationship between the primitive subject area and its central entity type, matrices used during the Planning project are available that use primitive subject areas instead of the central entity type. This also allows entity types that are not central to be added to the Data List without having them appear in the matrices. This is the same concept that keeps processes from appearing in the matrices. Entity types on the data side, just like processes on the activity side of the model, represent the beginning of Analysis and the end of Planning, and do not appear in Planning matrices as explained hereinabove.

In summary, functions act on subject areas, processes act on entity types.

Figure 25:
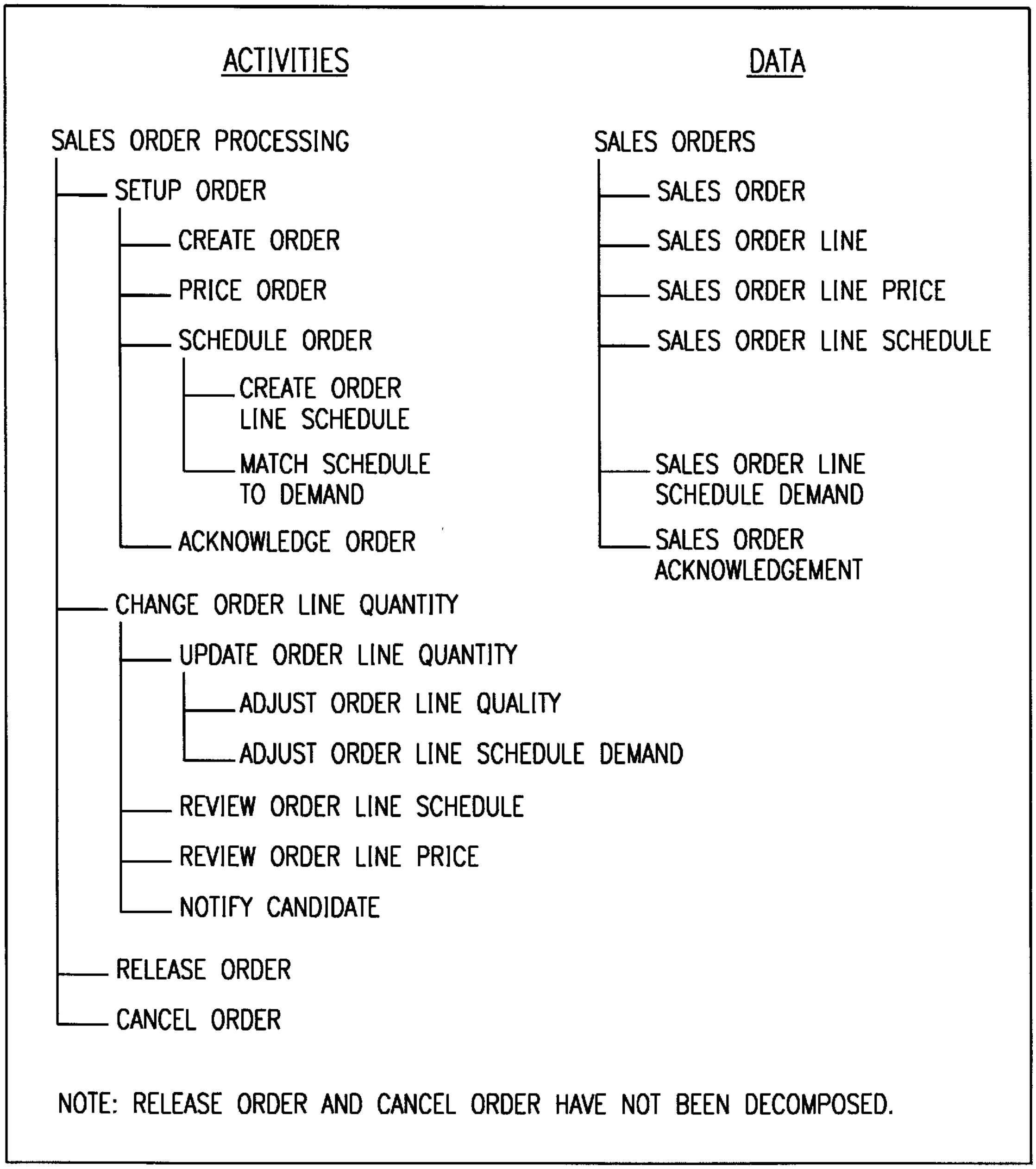
FIGS. 25–26 are examples of parallel data and activity decomposition in accordance with the present invention.

The following are examples of parallel decomposition. FIG. 25 shows that the process SETUP ORDER created occurrence of the each of the entity types and confirmed the need for them. The other identified processes used the entity types identified/confirmed by SETUP ORDER.

Figure 26:
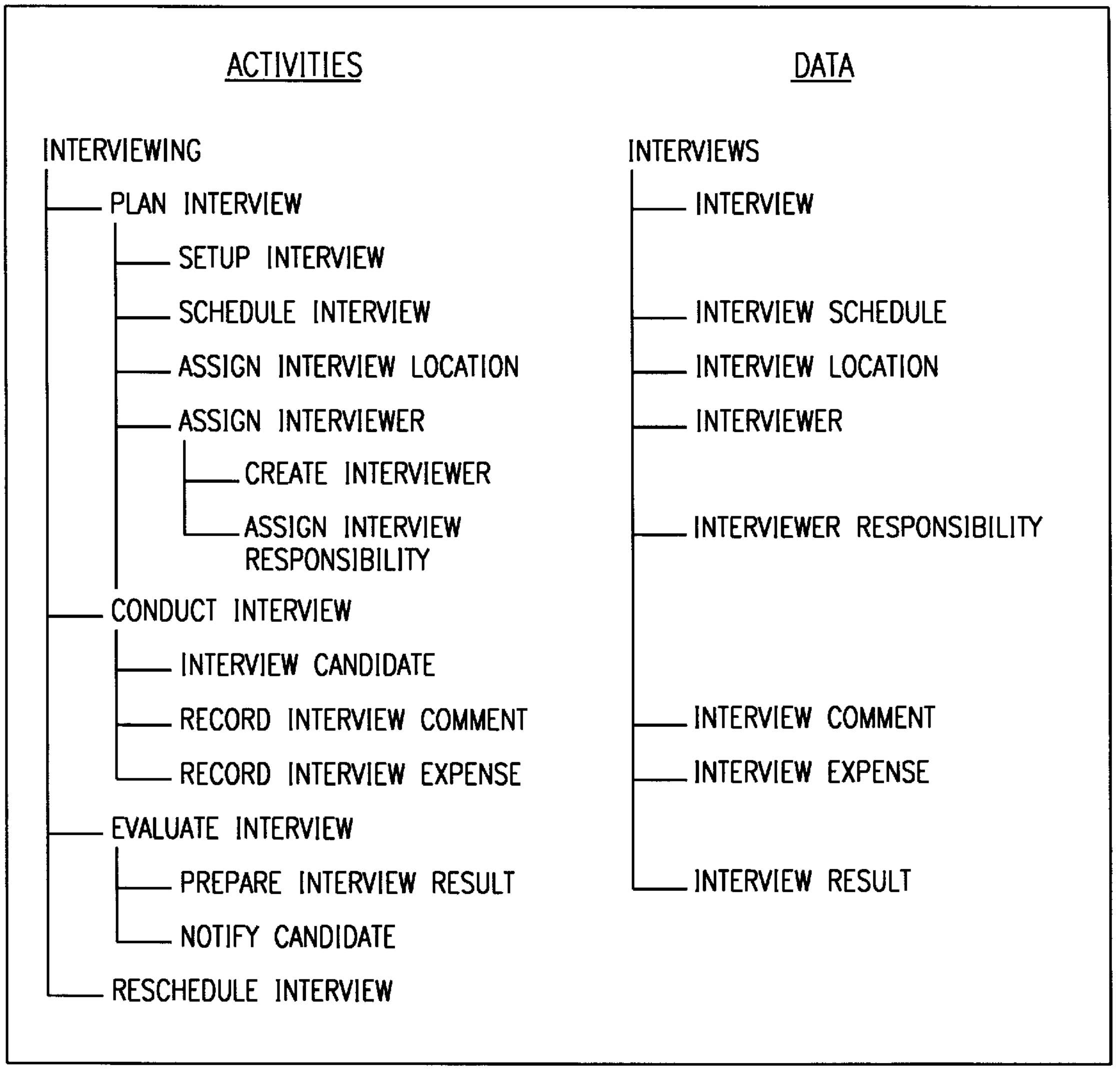

FIG. 26 shows another partial decomposition of activities. Note that the processes shown under activates gave birth to entity types listed under data. Also, the entity types shown under data identify and confirm the entity types included in the processes under activates.

Parallel decomposition enables a number of benefits over and above reducing time spent in the product development cycle. These benefits include enhancement of:

(1) Quality of data and activity models—Portions of the model already developed require no or only minimal reword which attest to the higher quality achieved under the system 30. Also, progressively developing data and activates in parallel allows adding to the prior level without disrupting the framework of the higher level.

(2) Project management—The size of an Analysis project can be effectively estimated by using metrics for functions and subject areas defined under the system 30.

These definitions also form effective boundaries for the scope of the project and can be used to control the scope as the project progresses.

(3) Coordination of model development—Parallel decomposition enables identifying highly cohesive areas of data and activates. Often these are shared data objects that can be used by multiple resources within a project or across projects.

(4) Repository management—A natural by-product of parallel development is the reduction in complexities in central encyclopedia management. The enhanced levels of control, consistency, and coordination serve to reduce the number of unloads and downloads, subsets that have to be checked in, and instances of detailing by functions other than the one that creates occurrences of the function.

These benefits have particular value in that they often bear directly on the quality, timeliness, and customer needs that are the framework of today's competitive environment. Additionally, as more companies develop models using parallel decomposition and the system 30, they stand to benefit from relationships and linkages with other companies that share information through, for example, an Electronic Data Interchange (EDI).

What is claimed is:

1. A system for developing reusable models, each of said models made up of at least one object, the system comprising:

a consultation tool coupled to an object repository, a lexicon module and an object types module for generating an initial client model in accordance with user responses to predefined consultation questions, said lexicon module being operable to store a plurality of words and at least one synonym of at least one of the words;

a customizing tool coupled to said object repository, said lexicon module and said object types module for customizing said client model to a particular business enterprise to generate a customized client model in accordance with user responses to predefined customization questions;

wherein said object repository stores a plurality of predefined objects;

wherein said lexicon module is operable to analyze said user responses and to identify parts of speech in user responses having a plurality of parts of speech, and wherein said consultation tool includes means for defining nouns in said user responses as data objects and verbs in said user responses as activity objects;

wherein said consultation tool includes means for decomposing said data objects and said activity objects in parallel until said data objects and said activity objects can no longer be decomposed or until said user terminates decomposition;

wherein said object types module associates each of said data and activity objects with an object type and said consultation tool includes means for using said object type to identify similar objects from said plurality of predefined objects in said object repository; and further including a model analyzer tool coupled to said object repository and said lexicon module for selecting at least one candidate model from said object repository, for determining comparison criteria and termination criteria in accordance with responses by said user to predefined comparison questions, for comparing and analyzing said customized client model to said at least one candidate model in accordance with said comparison criteria; and for reinitializing said customization tool in response to said comparison and said analysis until said termination criteria is met.

2. The system of claim 1 wherein said model analyzer tool is a knowledge based expert system and is operable to modify said predefined comparison questions in accordance with said user responses.

* * * * *